United States Patent
Kim et al.

(10) Patent No.: US 6,774,967 B2
(45) Date of Patent: Aug. 10, 2004

(54) MULTI-DOMAIN LIQUID CRYSTAL DISPLAY DEVICE

(75) Inventors: Kyeong Jin Kim, Puchon-shi (KR); Yun Bok Lee, Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 236 days.

(21) Appl. No.: 09/758,566

(22) Filed: Jan. 12, 2001

(65) Prior Publication Data

US 2001/0022643 A1 Sep. 20, 2001

(30) Foreign Application Priority Data

Jan. 12, 2000 (KR) .......................................... 2000-1403

(51) Int. Cl.[7] ..................... G02F 1/1337; G02F 1/1339; G02F 1/1343
(52) U.S. Cl. ........................ 349/129; 349/39; 349/156; 349/191
(58) Field of Search ........................ 349/39, 129, 156, 349/191

(56) References Cited

U.S. PATENT DOCUMENTS 5,339,181 A * 8/1994 Kim et al. ..................... 349/38
6,160,601 A   12/2000 Sato
6,356,335 B1 * 3/2002 Kim et al. .................. 349/156
6,384,889 B1 * 5/2002 Miyachi et al. ............. 349/143
6,462,798 B1 * 10/2002 Kim et al. .................. 349/129

FOREIGN PATENT DOCUMENTS

| DE | 199 50 366 A1 | 5/2000 |
|---|---|---|
| GB | 2347779 | 9/2000 |
| GB | 2362021 | 11/2001 |

* cited by examiner

Primary Examiner—Robert H. Kim
Assistant Examiner—Andrew Schechter
(74) Attorney, Agent, or Firm—McKenna Long & Aldridge LLP

(57) ABSTRACT

A multi-domain liquid crystal display device includes: first and second substrates opposing each other; a liquid crystal layer formed between the first substrate and the second substrate; a plurality of gate lines and data lines formed on the first substrate lengthwise and crosswise to define pixel regions; a pixel electrode formed in the pixel regions; at least one or more electric field induction windows independently formed in the pixel electrode; a common auxiliary electrode formed on a layer equal to the gate lines to surround the pixel regions; a common electrode formed on the second substrate; at least one or more dielectric structures independently formed on the common electrode to distort electric field applied to the liquid crystal layer; and an alignment film formed on at least one of the first and second substrates.

16 Claims, 25 Drawing Sheets

MULTI-DOMAIN LIQUID CRYSTAL DISPLAY DEVICE

This application claims the benefit of Korean Patent Application No. 2000-1403, filed on Jan. 12, 2000, which is hereby incorporated by reference for all purposes as if fully set forth herein.

BACKGROUND OF THE INVENTION

1. Field of the Invention

The present invention relates to a liquid crystal display device, and more particularly, to a multi-domain liquid crystal display device in which a common auxiliary electrode is formed around and in a pixel region on the same layer as a gate line, and an electric field induction window and a dielectric structure are formed in the pixel region.

2. Discussion of the Related Art

Among flat-panel displays enjoying image quality equivalent of the one offered by cathode ray tubes (CRT), liquid crystal displays (LCD) have been most widely adopted. In particular, a thin-film transistor (TFT) type LCD (TFT-LCD) has been used in personal computers, word processors, office automation equipment, and home electrical appliances including, among other items, a portable television sets. The market for suck LCDs is expected to further expand in the future. Accordingly, there is a demand for further improvement in image quality.

A description will be made by taking the TFT LCD for instance. However, the present invention is not limited to the TFT LCD but can apply to a simple matrix LCD, a plasma addressing type LCD and so forth. Generally, the present invention is applicable to LCDs which include liquid crystal sandwiched between a pair of substrates on which electrodes are respectively formed and displays images by applying voltage between the electrodes.

Currently, a mode most widely adopted for the TFT LCD is a normally-white mode that is implemented in a twisted nematic (TN) LCD. The technology of manufacturing the TN TFT LCD has advanced considerably in recent years. Contrast and color reproducibility provided by the TN TFT LCD have surpassed those offered by the CRT. However, the TN LCD has a critical drawback of a narrow viewing angle range, which limits the application of the TN LCD.

FIGS. 1A to 1C are diagrams for explaining the narrow viewing angle problem. FIG. 1A shows a state of white display to which no voltage is applied and liquid crystal molecules are aligned in the same direction with a slight inclination (about 1° to 5°). For convenience sake, the liquid crystal molecules are illustrated as in FIG. 1A. In this state, light is seen nearly white in any azimuth. Moreover, as shown in FIG. 1C when voltage is applied, intermediate liquid crystal molecules, except those located near the alignment films, are aligned in a vertical direction. Incident linearly-polarized light is therefore seen black, but not twisted. At this time, the direction of light obliquely incident to a screen (panel) is twisted to some extent because it passes obliquely through the liquid crystal molecules that are aligned in the vertical direction. The light is therefore seen halftone (gray), but not perfect black.

As shown in FIG. 1B, when an intermediate voltage, which is lower than the voltage applied in the state shown in FIG. 1C, is applied, the liquid crystal molecules near the alignment films are aligned in a horizontal direction, but the liquid crystal molecules in the middle parts of cells erect themselves halfway. The birefringent property of the liquid crystal is lost to some extent. This causes transmittance to deteriorate and brings about halftone (gray) display. However, this effect occurs only to light incident perpendicularly on the liquid-crystal panel. Obliquely incident light is seen differently, that is, light is seen differently depending on whether it is seen from the left or right side of the drawing (panel). As illustrated, the liquid crystal molecules are aligned mutually parallel relative to light propagating from right below to left above. The liquid crystal hardly exerts a birefringent effect. Therefore, when the panel is seen from left, it is seen black. By contrast, the liquid crystal molecules are aligned vertically relative to light propagating from below on the right to above on the left. The liquid crystal exerts a great birefringent effect relative to incident light, and the incident light is twisted. This results in nearly white display. Thus, the most critical drawback of the TN LCD is that the display state varies depending on the viewing angle.

It is known that viewing angle performance of a liquid crystal display device (LCD) in the TN mode can be improved by setting the orientation directions of the liquid crystal molecules inside pixels to a plurality of mutually different directions. Generally, the orientation direction of the liquid crystal molecules (pre-tilt angles) that keep contact with a substrate surface in the TN mode are restricted by the direction of a rubbing treatment applied to the alignment film. The rubbing treatment is a process which rubs the surface of the alignment film in one direction by a cloth such as rayon, and the liquid crystal molecules contacting the alignment film are orientated in the rubbing direction. Therefore, viewing angle performance can be improved by making the rubbing direction different inside the pixels.

FIGS. 2A to 2C show a method of making the rubbing direction different inside the pixels. As shown in this drawing, an alignment film 101 is formed on a glass substrate 100 (whose electrodes, etc., are omitted from the drawing). This alignment film 101 is then bought into contact with a rotating rubbing roll 102 to execute the rubbing treatment in one direction. Next, a photo-resist is applied to the alignment film 101 and a predetermined pattern is exposed and developed by photolithography. As a result, a patterned layer 103 of the photo-resist is formed as shown in FIGS. 2B and 2C. Next, the alignment film 101 is brought into contact with a rubbing roll 201 that is rotating in a direction opposite the direction of the previous rotating rubbing roll 102, so that only the open portions of the pattern are rubbed. In this way, a plurality of regions that are subjected to the rubbing treatment in different directions are formed inside the pixel, and the plural orientation directions of the liquid crystal are formed inside the pixel. Incidentally, the rubbing treatment can be done in arbitrarily different directions when the alignment film 101 is rotated relative to the rubbing roll 102.

As described above, there are some problems related to a division of orientation directions of the liquid crystal molecules for improving the viewing angle performance in the VA LCD.

It is desirable to improve a viewing angle characteristic of a VA liquid crystal display, and to realize a VA liquid crystal display exhibiting a viewing angle characteristic that is as good as or better than that exhibited by an in-plane switching (IPS) mode LCD, while permitting the same contrast and operation speed as the conventional liquid crystal displays.

According the an embodiment of the present invention, a VA mode LCD uses a conventional vertical alignment film, and adopting a negative liquid crystal, and a domain regulating means for regulating the orientation of a liquid crystal.

Liquid crystal molecules are aligned obliquely when a voltage is applied, so that the orientation will include a plurality of directions within each pixel. The domain regulating means is provided on at least one of the substrates. Further, at least one of domain regulating means has inclined surfaces (slopes). The inclined surfaces include surfaces which are almost vertical to the substrates. Rubbing need not be performed on the vertical alignment film.

In the VA LCD device, when no voltage is applied, in almost all regions of the liquid crystal other than the protrusions, liquid crystal molecules are aligned nearly vertically to the surfaces of the substrates. The liquid crystal molecules near the inclined surfaces also orientate vertically to the inclined surfaces. When a voltage is applied, the liquid crystal molecules tilt according to electric field strength. Since the electric fields are vertical to the substrates, when a direction of tilt is not defined by carrying out rubbing, the azimuth in which the liquid crystal molecules tilt includes all directions of 360°. If there are pre-tilted liquid crystal molecules, surrounding liquid crystal molecules are tilted in the directions of the pre-tilted liquid crystal molecules. Even when rubbing is not carried out, the directions in which the liquid crystal molecules lying in gaps between the protrusions can be restricted to the azimuths of the liquid crystal molecules in contact with the surfaces of the protrusions. When voltage is increased, the negative liquid crystal molecules are tilted in directions vertical to the electric fields.

Recently, a liquid crystal display device which drives a liquid crystal by an auxiliary electrode, which is electrically insulated from a pixel electrode, without aligning the liquid crystal has been suggested. Such a related art liquid crystal display device will be described with reference to FIG. 3.

As shown in FIG. 3, the related art liquid crystal display device includes a first substrate, a second substrate, a plurality of data lines and gate lines, a thin film transistor, a passivation film 37, a pixel electrode 13, and an auxiliary electrode 21. The data lines and gate lines are formed on the first substrate lengthwise and crosswise to divide the first substrate into a plurality of pixel regions. The thin film transistor is formed in each pixel region on the first substrate and includes a gate electrode, a gate insulating film, a semiconductor layer, an ohmic contact layer, and source/drain electrodes. The passivation film 37 is formed on the first substrate. The pixel electrode 13 is formed on the passivation film 37 to be connected with the drain electrode. The auxiliary electrode 21 is formed on the gate insulating film to partially overlap the pixel electrode 13.

The related art liquid crystal display device further includes a light-shielding layer 25, a color filter layer 23 formed on the light-shielding layer 25, a common electrode formed on the color filter layer 23, and a liquid crystal layer formed between the first substrate and the second substrate. The light-shielding layer 25 is formed on the second substrate to shield light leaked from the gate lines, the data lines, and the thin film transistor.

The auxiliary electrode 21 formed around the pixel electrode 13 and an open region 27 of a common electrode 17 distort electric field applied to the liquid crystal layer so that liquid crystal molecules are variously driven within a unit pixel. This is intended that a dielectric energy by the distorted electric field places a liquid crystal director at a desired position when a voltage is applied to the liquid crystal display device.

However, the liquid crystal display device requires the open region 27 in the common electrode 17 to obtain multi-domain effect. To this end, the process for patterning the common electrode is additionally required.

Furthermore, if the open region 27 is not formed or has a small width, distortion range of the electric field required to divide the domain is weak. Accordingly, there is a problem that, the time required for the liquid crystal director to reache a stable state, relatively increases. Such a domain division by the open region 27 causes unstable textures for each domain, thereby deteriorating picture quality. Also, because high electric field is applied between the pixel electrode 13 and the auxiliary electrode 21, luminance and response speed decrease.

SUMMARY OF THE INVENTION

Accordingly, the present invention is directed to a multi-domain liquid crystal display device that substantially obviates one or more of the problems due to limitations and disadvantages of the related art.

An object of the present invention is to provide provide a multi-domain liquid crystal display device in which a common auxiliary electrode is formed around and in a pixel region on a layer equal to a gate line, and electric field induction windows and dielectric structures are formed in the pixel region, so that stable texture and multi-domain effect can be obtained.

A multi-domain liquid crystal display device of the present invention is an improved invention of the Korean Patent Application No. 1999-07633 filed by the same applicant of this invention, in which a common auxiliary electrode is formed around a pixel region on a layer equal to a gate line, and electric field induction windows and dielectric structures are formed in the pixel region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-domain liquid crystal display device according to the present invention includes: first and second substrates opposing each other; a liquid crystal layer formed between the first substrate and the second substrate; a plurality of gate lines and data lines formed on the first substrate lengthwise and crosswise to define pixel regions; a pixel electrode formed in the pixel regions; at least one or more electric field induction windows independently formed in the pixel electrode; a common auxiliary electrode formed on a layer equal to the gate lines to surround the pixel regions; a common electrode formed on the second substrate; at least one or more dielectric structures independently formed on the common electrode to distort electric field applied to the liquid crystal layer; and an alignment film formed on at least one of the first and second substrates. The multi-domain liquid crystal display device further includes a common auxiliary electrode formed in a region where the electric field induction windows are formed, and the dielectric structures are formed to maintain a cell gap of the liquid crystal display device.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1A:
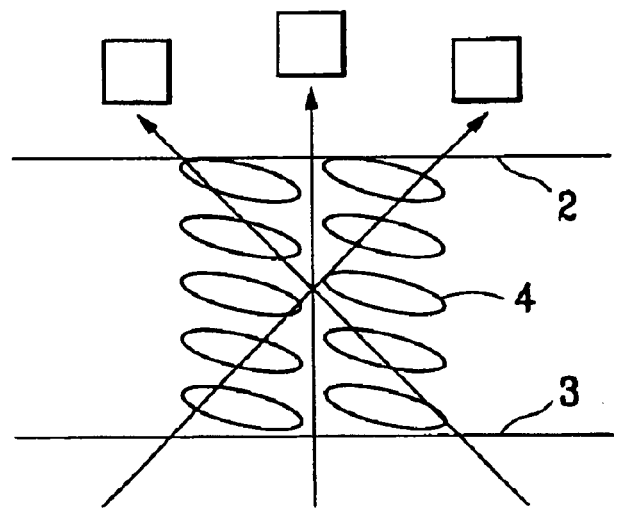
FIGS. 1A to 1C are diagram for explaining problem of TN TFT LCD.
Figure 1B:
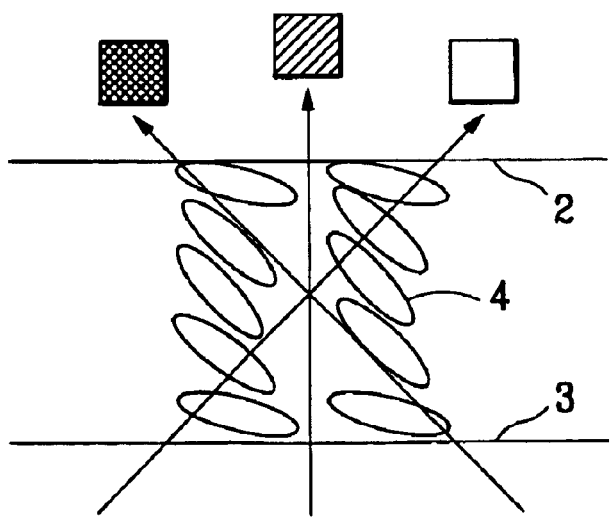
Figure 1C:
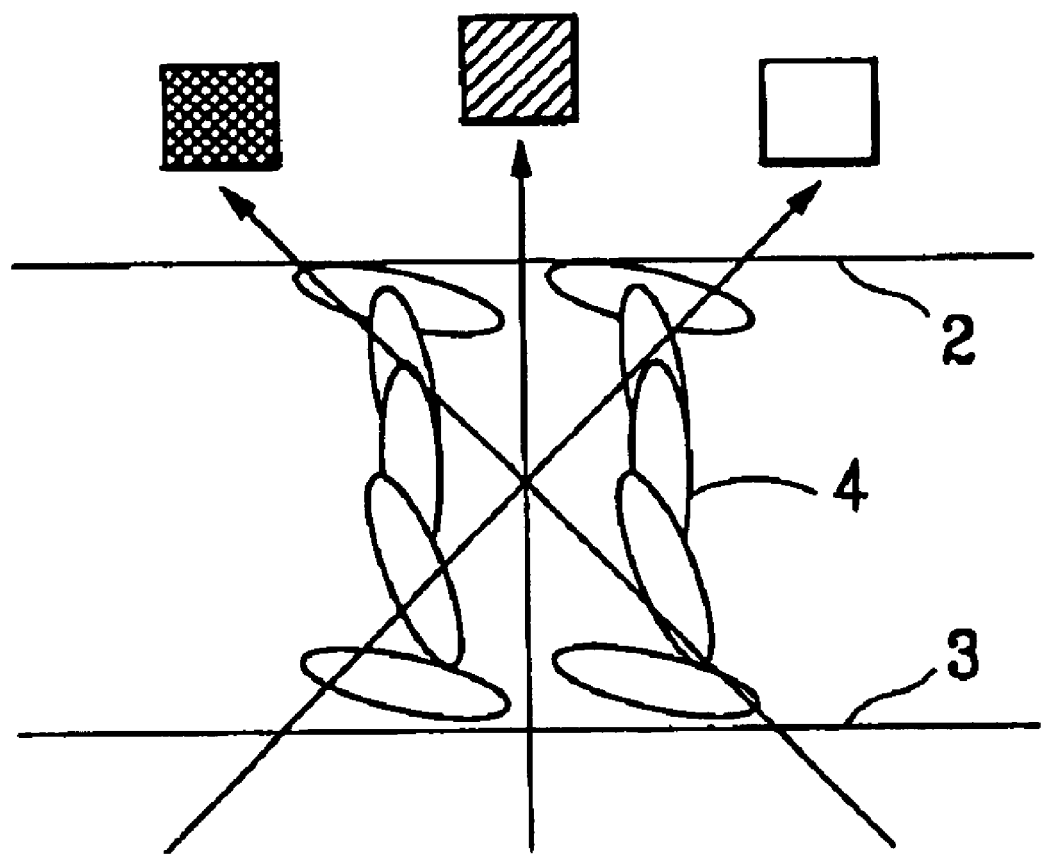
Figure 2A:
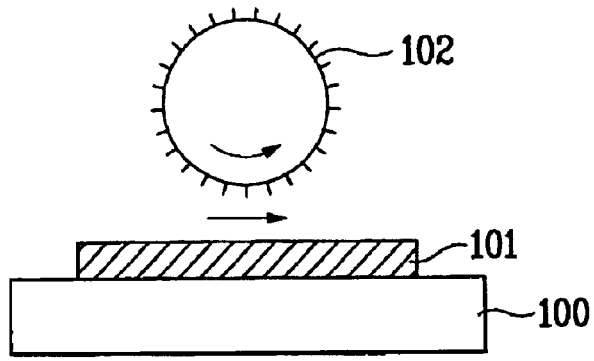
FIGS. 2A to 2C show a method of making the rubbing direction different inside the pixels.
Figure 2B:
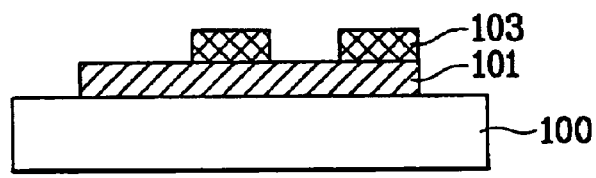
Figure 2C:
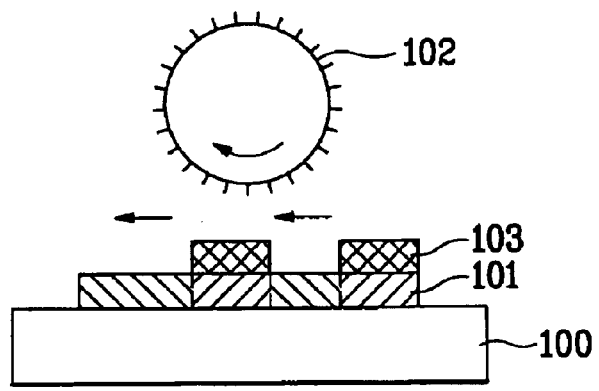
Figure 3:
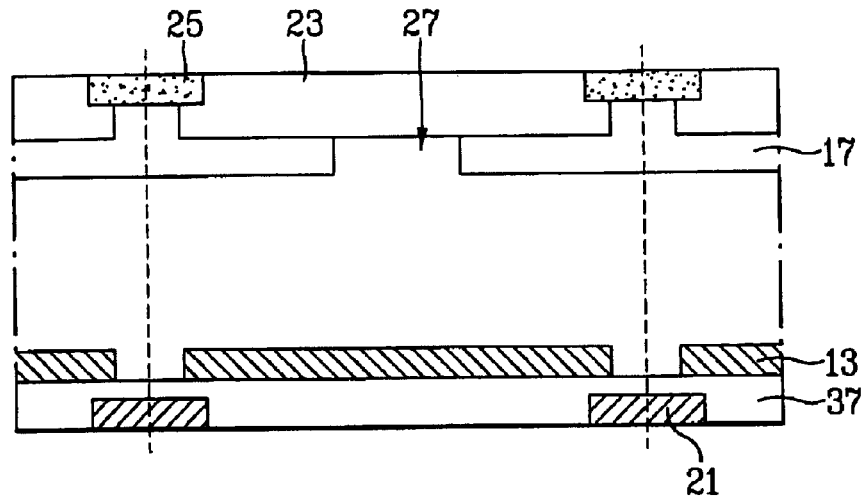
FIG. 3 is a sectional view showing a related art liquid crystal display device.

Reference will now be made in detail to the preferred embodiment of the present invention, example of which is illustrated in the accompanying drawings.

A multi-domain liquid crystal display device of the present invention will be described with reference to the accompanying drawings.

As shown in FIGS. 4–15, the multi-domain liquid crystal display device includes a first substrate 31, a second substrate 33, a plurality of data lines 3 and gate lines 1, a common auxiliary electrode 15, a thin film transistor, a passivation film 37, and a pixel electrode 13.

The data lines 3 and gate lines 1 are formed on the first substrate 31 lengthwise and crosswise to divide the first substrate into a plurality of pixel regions. The common auxiliary electrode 15 is formed on the same layer as the gate lines 1 to distort electric field. The thin film transistor is formed in each pixel region on the first substrate and includes a gate electrode 11, a gate insulating film 35, a semiconductor layer 5, an ohmic contact layer 6, and source/drain electrodes 7 and 9. The passivation film 37 is formed on an entire surface of the first substrate 31. The pixel electrode 13 is formed on the passivation film 37 to be connected with the drain electrode 9.

At least one or more electric field induction windows 51 are independently formed in the pixel electrode 13 to compensate electric field formed by the common auxiliary electrode 15. Also, the pixel electrode 13 partially overlaps the common auxiliary electrode 15 and acts to remove disclination caused by uneven electric field applied from the common auxiliary electrode 15 and the pixel electrode 13 (FIGS. 4, 5, 6, 9 and 10).

The multi-domain liquid crystal display device further includes a light-shielding layer 25, a color filter layer 23 formed on the light-shielding layer 25, a common electrode 17 formed on the color filter layer 25, and a liquid crystal layer formed between the first substrate and the second substrate. The light-shielding layer 25 is formed on the second substrate 33 to shield light leaked from the gate lines 1, the data lines 3 and the thin film transistor.

One or more dielectric structures 53 are independently formed on the common electrode 17. The dielectric structures 53 variously distort the electric field applied to the liquid crystal layer to achieve display stability of the liquid crystal display device and multi-domain effect. If the dielectric structures 53 are formed high to maintain a cell gap, the dielectric structures 53 act as spacers of the liquid crystal display device.

The dielectric structures 53 is a single point that stabilizes a screen in the pixel regions and displays uniform picture. That is to say, more stable screen display can be obtained by using the dielectric structures 53.

As shown in FIGS. 5, 6, 8, 10 and 12, to fabricate the aforementioned multi-domain liquid crystal display device, the thin film transistor comprising the gate electrode 11, the gate insulating film 35, the semiconductor layer 5, the ohmic contact layer and the source/drain electrodes 7 and 9 is formed in each pixel region of the first substrate 31. At this time, the plurality of gate lines 1 and data lines 3 are formed to divide the first substrate 31 into a plurality of pixel regions.

The gate electrode 11 and the gate lines 1 are formed in such a manner that metals such as Al, Mo, Cr, Ta, or Al alloy, or a double layer formed of two of these metals, are layered by sputtering and patterned. At the same time, the common auxiliary electrode 15 is formed to surround the pixel region. The gate insulating film 35 is formed in such a manner that $SiN_X$ or $SiO_X$ is deposited on the common auxiliary electrode by plasma enhancement chemical vapor deposition (PECVD). Subsequently, the semiconductor layer 5 and the ohmic contact layer are formed in such a manner that a-Si and $n^+$ a-Si are deposited by PECVD and patterned. Alternatively, the gate insulating film 35 is formed in such a manner that $SiN_X$ or $SiO_X$, a-Si and $n^+$ a-Si are successively deposited. The semiconductor layer 5 and the ohmic contact layer 6 are formed in such a manner that a-Si and $n^+$ a-Si are patterned. To improve aperture ratio, the gate insulating film 35 may be formed of BCB (BenzoCycloButene), acrylic resin, or polyimide compound.

Metals such as Al, Mo, Cr, Ta or Al alloy, or double layers of two of these metals, are layered by sputtering and patterned so that the data lines 3 and the source/drain electrodes 7 and 9 are formed. At this time, a storage electrode is formed to overlap the gate lines 1 and/or the common auxiliary electrode 15. The storage electrode acts as a storage capacitor together with the gate lines 1 and/or the common auxiliary electrode 15.

Subsequently, the passivation film 37 is formed of a material such as BCB, acrylic resin, polyimide compound, $SiN_X$ or $SiO_X$ on the first substrate 31. A metal such as indium tin oxide (ITO) is deposited by sputtering and patterned to form the pixel electrode 13.

At this time, the pixel electrode 13 is connected with the drain electrode 9 and the storage electrode through a contact hole and patterned in various forms to form electric field induction windows therein.

When the common auxiliary electrode 15 is formed of the same material as the gate lines 1, it is formed on the same layer as the gate lines 1 and electrically connected with the common electrode 17 using one mask. An additional mask may be used to form other metal or different double layers. Alternatively, the common auxiliary electrode 15 may be formed on a layer equal to the pixel electrode 13.

In the embodiments according to the liquid crystal display device of the present invention, L-shaped thin film transistors having high aperture ratio are shown. The L-shaped TFT has an improved aperture ratio as compared with the related art due to its L-shape, and can reduce parasitic capacitance generated between the gate line and the drain electrode 9.

Also the thin film transistor may be formed in a U shape. Namely, the U shaped thin film transistor 7A having the source electrode which surrounds the drain electrode may be formed in a portion where the gate lines cross the data lines, as shown in FIG. 14.

Figure 14:
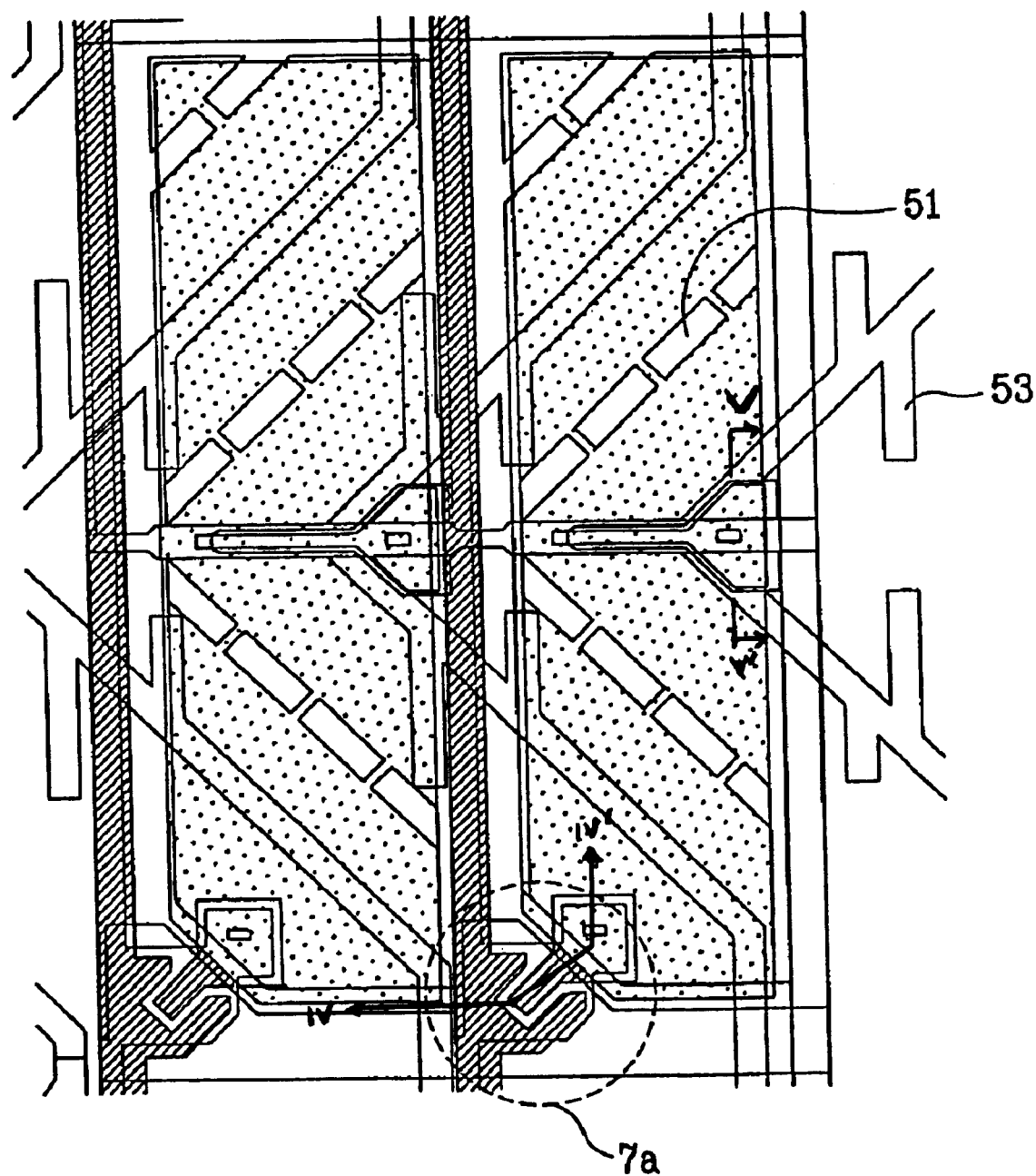
FIG. 14 is plane view showing a multi-domain liquid crystal display device using U-type thin film transistor according to another embodiment to the present invention.

As shown in FIG. 14, the dielectric structure 53 is patterned in a zig-zag shape. A plurality of electric field induction windows 51 are formed within the pixel region, and a projection is formed in the dielectric structure 53 at a boundary portion, bending portion or crossing portion of the pixel region.

Figure 15A:
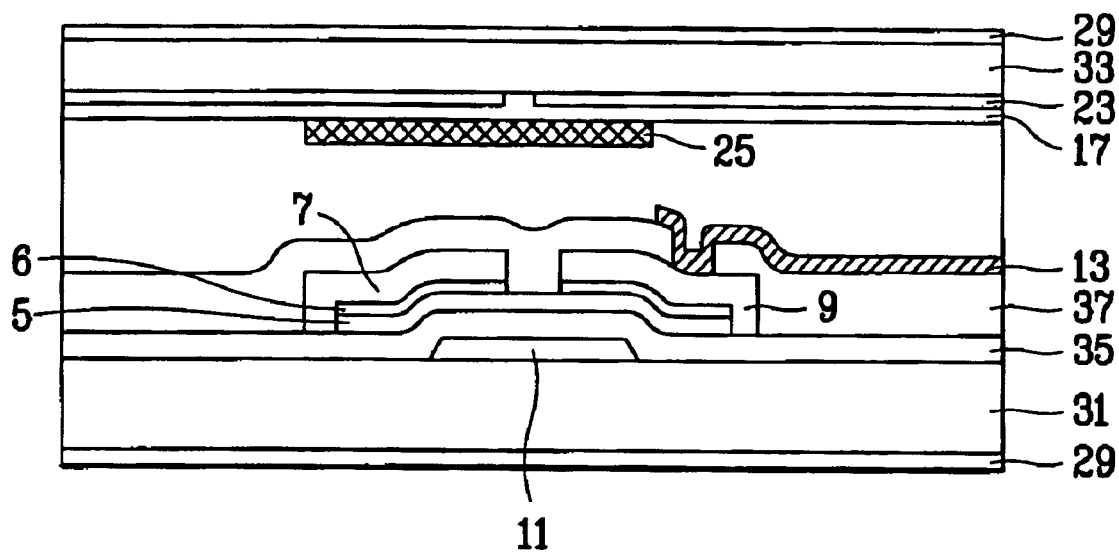
FIGS. 15A to 15B are sectional views showing a multi-domain liquid crystal display device, taken along lines IV–IV' and V–V' of FIG. 14.
Figure 15B:
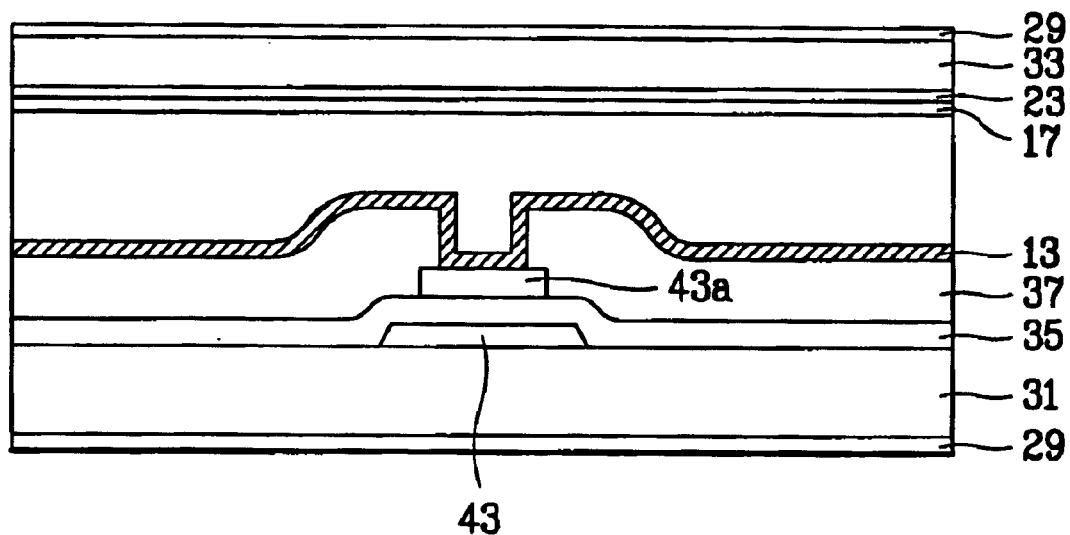

Meanwhile, FIG. 15A is a sectional view taken along line IV–IV' of FIG. 14, and FIG. 15B is a sectional view taken along line V–V'. A metal such as Al, Mo, Cr, Ta, or Al alloy is formed on the first substrate 31 by sputtering method. The metal is then patterned to form the gate lines 1, the gate electrodes 11, and the first gate electrode 43 of the storage capacitor. A gate insulating film 35 of silicon nitride or silicon oxide is formed on the entire surface of the substrate including the gate electrode 11 by plasma CVD.

At this time, to improve aperture ratio, the gate insulating film may be formed of BCB, acrylic resin or polyimide compound.

Afterwards, an amorphous silicon layer and n+amorphous silicon layer are stacked on the gate insulating film 35 and then patterned to form a semiconductor layer 5 and an ohmic contact layer 6. Alternatively, the gate insulating film of silicon nitride or silicon oxide, the amorphous silicon layer, and n+amorphous silicon layer may sequentially be deposited, and the amorphous silicon layer and the n+amorphous silicon layer may be patterned to form the semiconductor layer 5 and the ohmic contact layer 6.

A metal such as Al, Mo, Cr, Ta, or Al alloy is formed by sputtering method and then patterned to form the data lines in a direction crossing the gate lines, the drain electrode 9 of the thin film transistor, the source electrode 7 surrounding the drain electrode 9, and the second electrode 43A of the storage capacitor.

Subsequently, the passivation film 37 of BCB, acrylic resin, polyimide compound, silicon nitride, or silicon oxide is formed on the entire surface including the source/drain electrodes 7 and 9 and the second electrode 43A of the storage capacitor. A transparent conductive material such ITO is formed and then patterned to form the pixel electrode 13 having the electric field induction window 51 of a plurality of hole or silt shapes within each domain.

As described above, problems related to flicker and image quality can be solved by forming the thin film transistor in a U shape.

The light-shielding layer 25 is formed on the second substrate 33, and the color filter layer 23 is formed to repeat R (red), G (green) and B (blue) elements for each pixel. The common electrode 17 is formed of a transparent electrode such as ITO on the color filter layer 23, in the same manner as the pixel electrode 13. A photoresist material is deposited on the common electrode 17 and patterned by photolithography to form dielectric structures 53. Additionally, the common electrode 17 may be patterned in various forms to form electric field induction windows 51 such as hole or slit.

Subsequently, liquid crystal is injected between the first substrate 31 and the second substrate 33 so that a multi-domain liquid crystal display device is completed. The liquid crystal has a positive dielectric anisotropy or a negative dielectric anisotropy. The liquid crystal may have a chiral dopant.

The liquid crystal is injected by dispenser method. Namely, a seal pattern for bonding two substrates is formed on the first substrate 31, and the liquid crystal is injected into the seal pattern by the dispenser method.

After a spacer is distributed on the second substrate 33 to uniformly maintain the cell gap of the liquid crystal, the first substrate 31 in which the seal pattern is formed and the second substrate 33 are bonded to each other. The seal pattern is then hardened by giving UV only or UV and heat.

Meanwhile, to form the liquid crystal layer, in addition to a method for dropping the liquid crystal in a decompression state, after making the inside of the cell in vacuum state, using the resultant pressure difference (capillary tube phenomenon) the liquid crystal may be entered into the cell. Alternatively, a generally known method for injecting a liquid crystal may be applied. For reference, when the dispenser method is applied to a large sized substrate, it is possible to reduce liquid crystal formation time. When liquid crystal having a negative dielectric anisotropy is used, it is possible to improve injection time of the liquid crystal because viscosity of the liquid crystal is high. Also, a columned spacer may be used as the spacer, and a UV hardening type seal material, or a seal material that can be hardened at a room temperature may be used as a material of the seal pattern.

The dielectric structures 53 are independently formed and distort electric field applied to the liquid crystal layer. Preferably, the dielectric structures 53 have dielectric constants equal to or smaller than the liquid crystal layer, and more preferably 3 or below. A material such as photoacrylate or BCB may be used for the dielectric structures.

To apply a voltage $V_{com}$ to the common auxiliary electrode 15, an Ag-Dotting portion is formed in each corner of a driving region of the liquid crystal display device on the first substrate 31. The electric field is applied to the second substrate 33 to drive the liquid crystal by the potential difference between upper and lower substrates. The Ag-Dotting portion of each corner is connected with the common auxiliary electrode 15. Thus, the voltage $V_{com}$ is applied to the common auxiliary electrode 15. This process is performed when forming the common auxiliary electrode 15.

A phase difference film 29 is formed on at least one of the first substrate 31 and the second substrate 33.

The phase difference film 29 is a negative uniaxial film having one axis and acts to compensate a viewing angle of a user.

Therefore, a region having no gray inversion is expanded, contrast ratio in incline direction increases, and a multi-domain is formed by one pixel. Thus, a viewing angle in left and right direction can effectively be compensated.

In addition to the negative uniaxial film, a negative biaxial film having two axes may be formed as the phase difference film. The negative biaxial film can obtain viewing angle characteristics wider than the negative uniaxial film.

After attaching the phase difference film, a polarizer (not shown) is attached on both substrates. The polarizer may be formed in an integral form with the phase difference film.

Figure 4A:
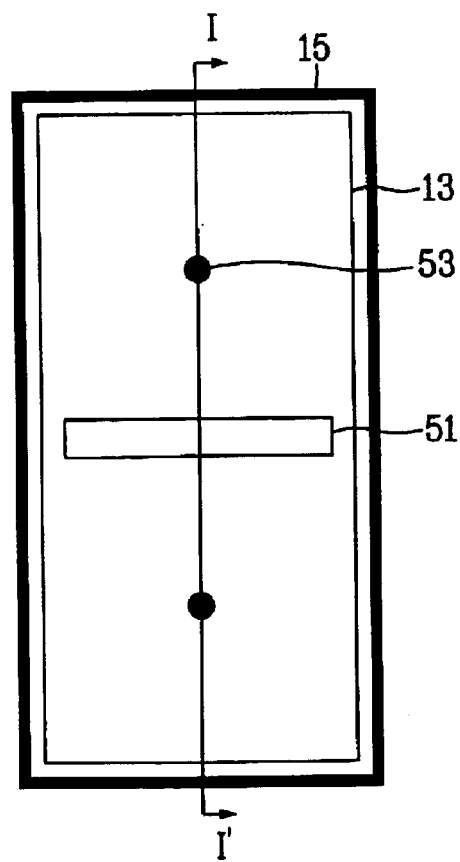
FIGS. 4A and 4B are plane views showing a multi-domain liquid crystal display device according to the first embodiment of the present invention.
Figure 4B:
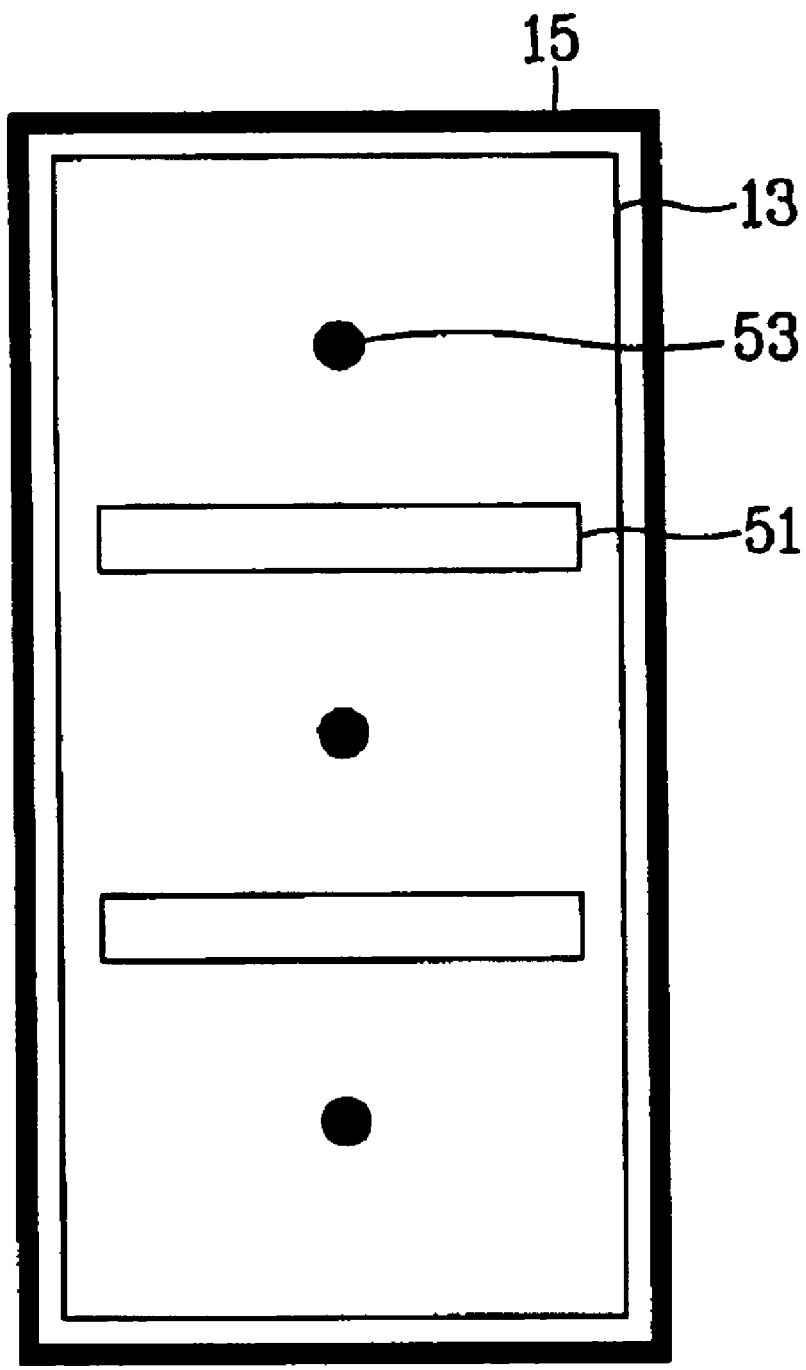
Figure 5:
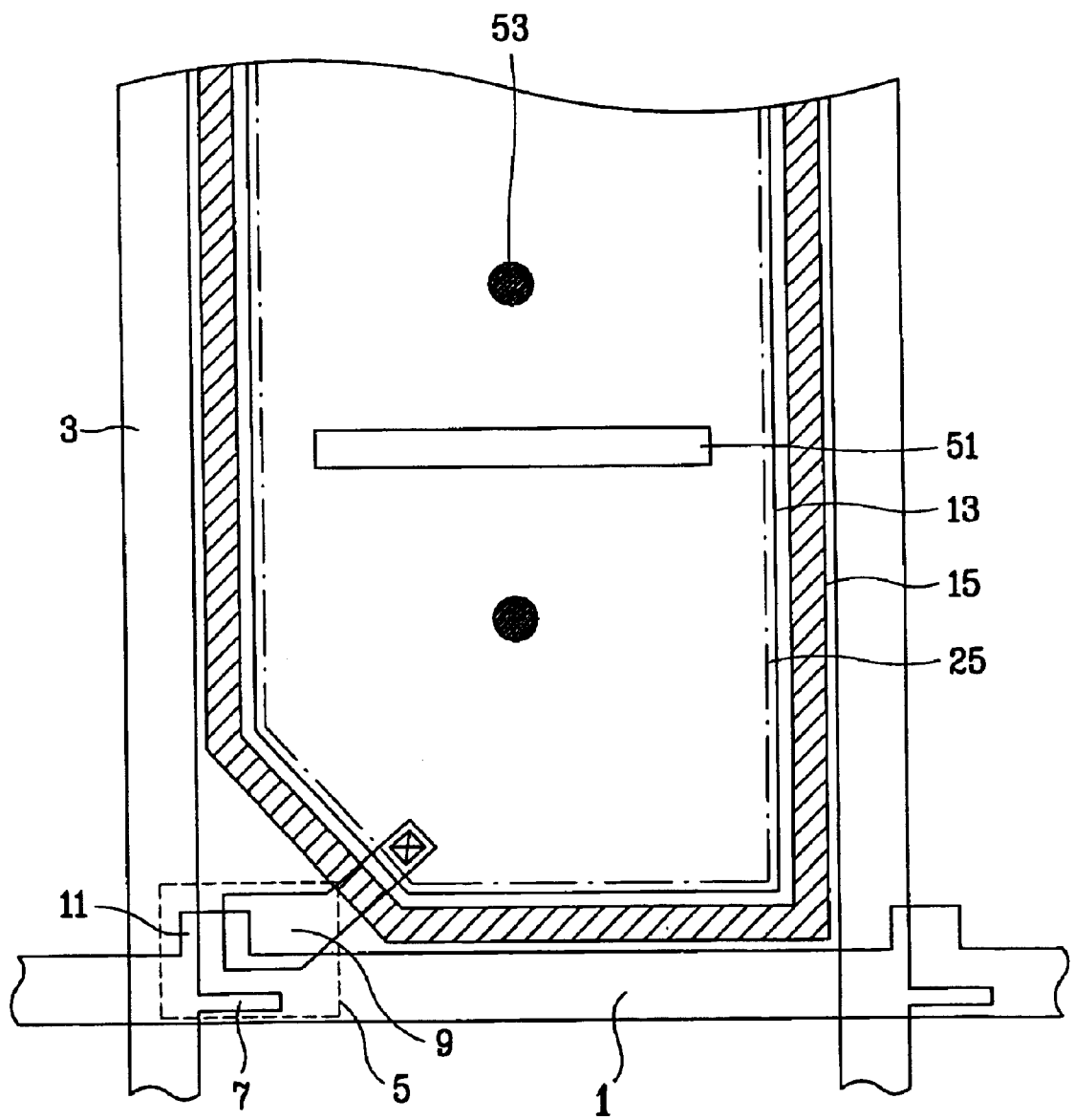
FIG. 5 is a plane view showing a multi-domain liquid crystal display device according to the present invention.

In the multi-domain liquid crystal display device shown in FIGS. 4A and 4B, at least one or more electric field induction windows 51 are formed in the pixel electrode 13. The common auxiliary electrode 15 is formed around the pixel regions, and dielectric structures 53 are formed in the pixel regions. In this structure, the pixel electrode 13 does not overlap the common auxiliary electrode 15 while the light-shielding layer 25 overlaps the pixel electrode to prevent light from being leaked out.

Figure 6A:
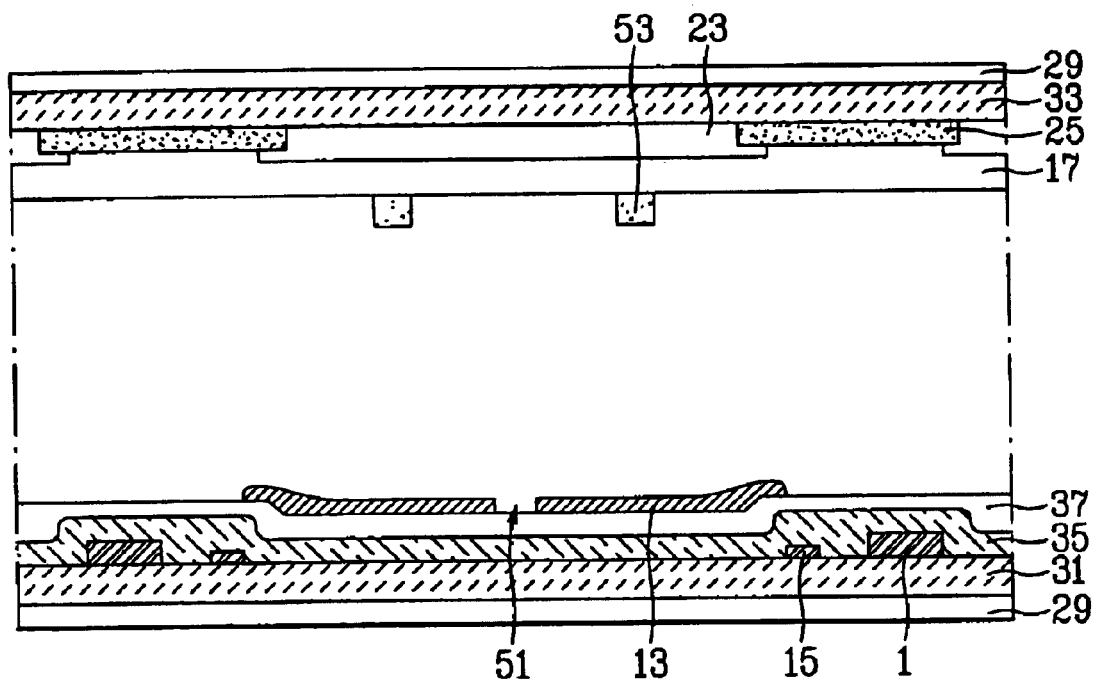
FIGS. 6A to 6F are sectional views showing a multi-domain liquid crystal display device, taken along lines I–I' of FIG. 4A.
Figure 6B:
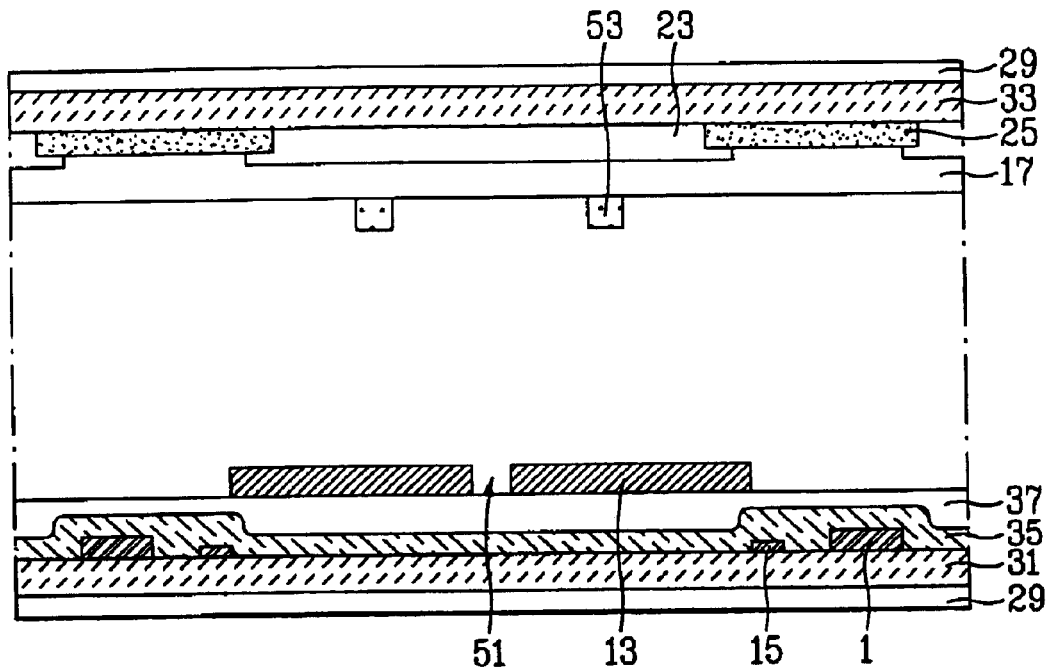
Figure 6C:
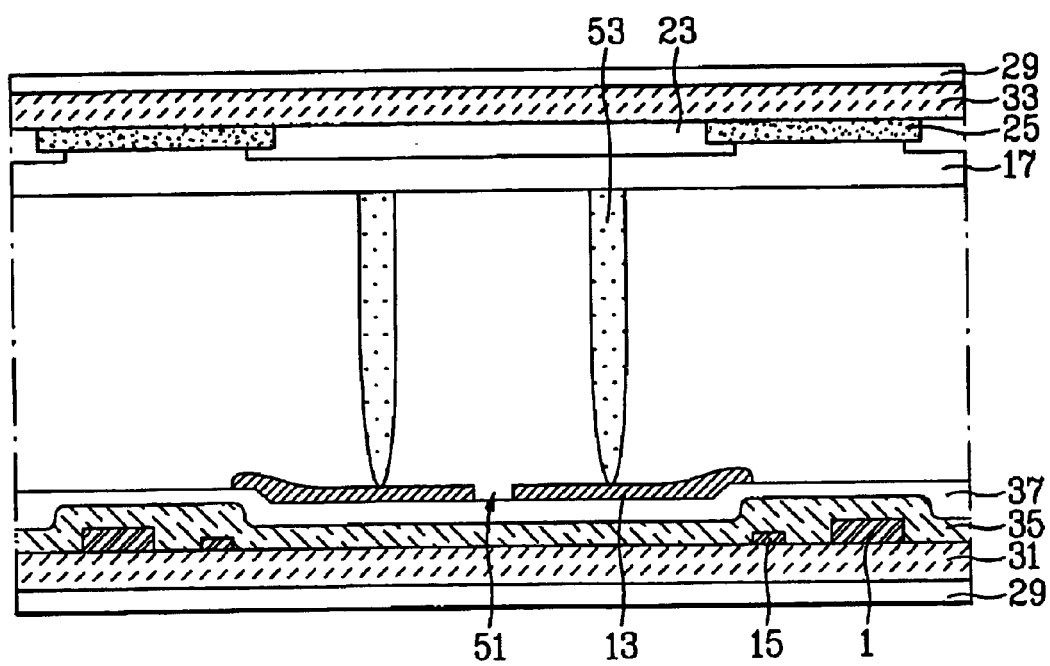
Figure 6D:
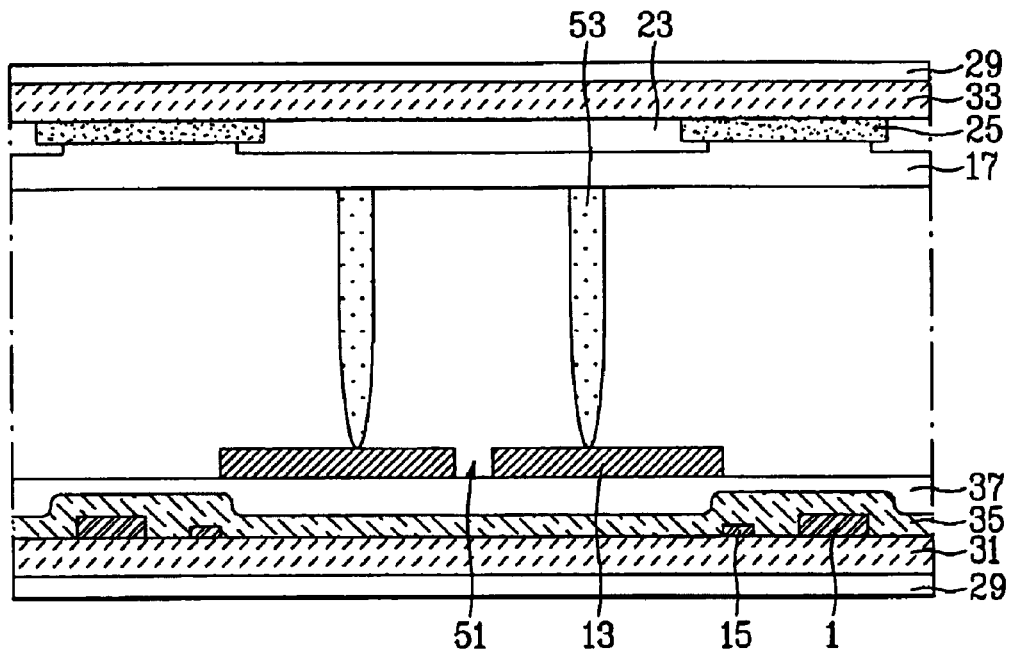
Figure 6E:
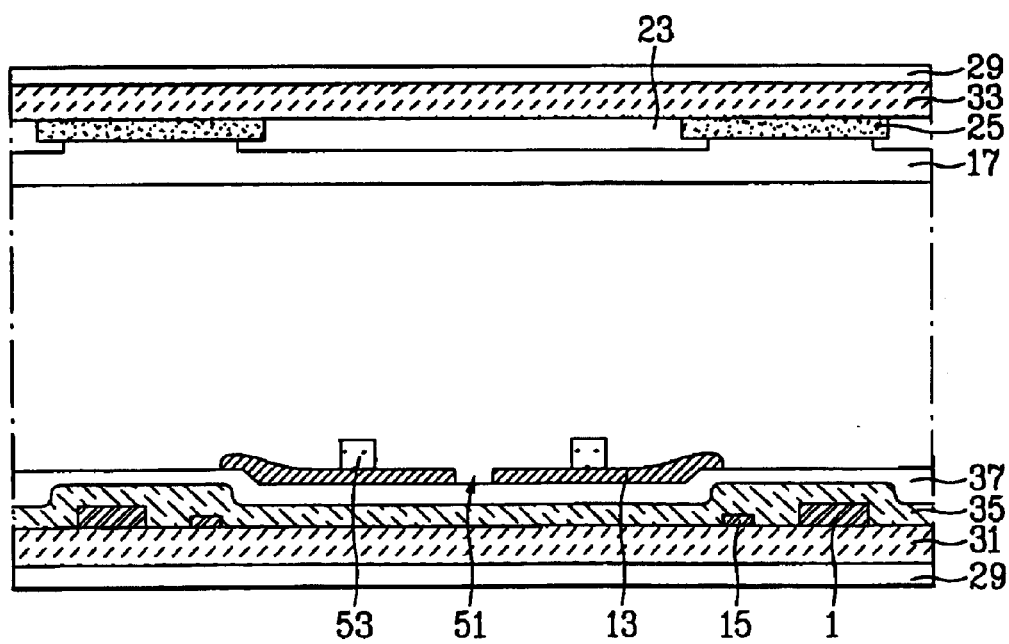
Figure 6F:
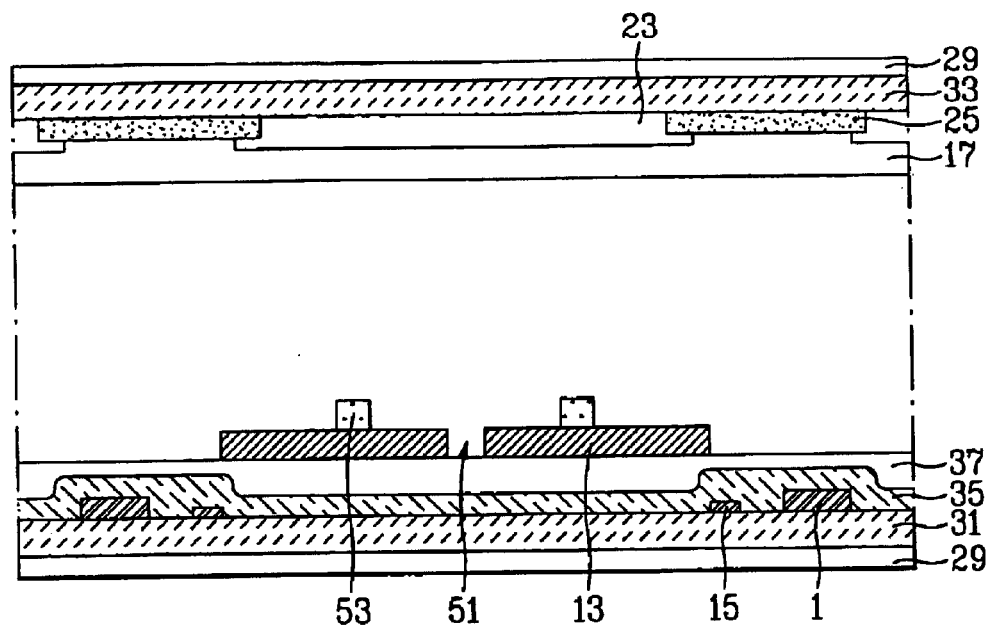

In FIGS. 6A and 6B, the dielectric structures 53 have low projection shapes. In FIGS. 6C and 6D, the dielectric structures 53 extend to the second substrate to maintain a cell gap of the liquid crystal display device. In FIGS. 6A and 6C, the passivation film 37 is formed of a material such as $SiN_x$ or $SiO_x$. In FIGS. 6B and 6D, the passivation film 37 is formed of BCB, acrylic resin or polyimide compound. In FIGS. 6E and 6F, the dielectric structures 53 have low projection shapes on the pixel electrode 13.

Figure 7A:
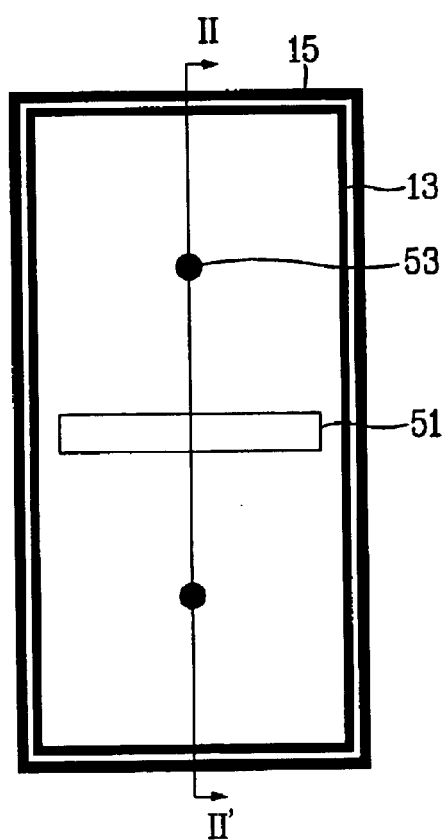
FIGS. 7A and 7B are plane views showing a multi-domain liquid crystal display device according to the second embodiment of the present invention.
Figure 7B:
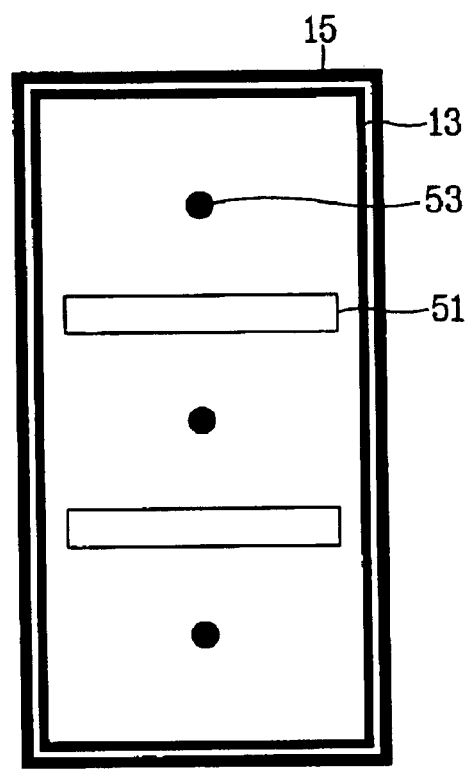

In the multi-domain liquid crystal display device shown in FIGS. 7A and 7B, at least one or more electric field induction windows 51 are formed in the pixel electrode 13, the common auxiliary electrode 15 is formed around the pixel regions, and dielectric structures 53 are formed in the pixel regions. In this structure, the pixel electrode 13 overlaps the common auxiliary electrode 15 to form a storage capacitor. The light-shielding layer 25 also overlaps the common auxiliary electrode 15 to improve aperture ratio.

Figure 8A:
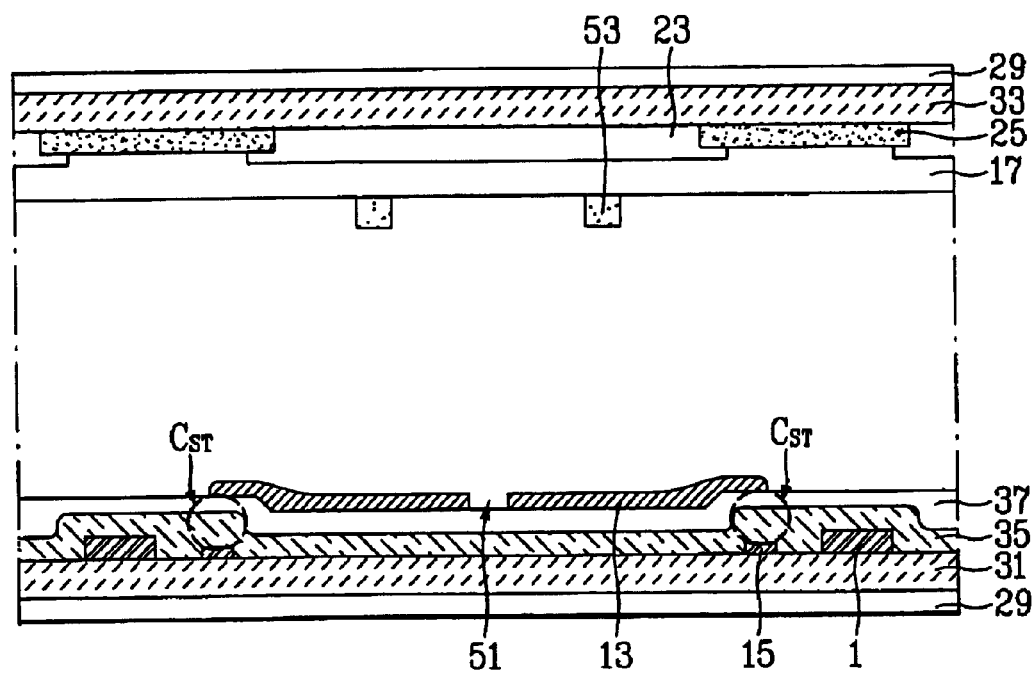
FIGS. 8A to 8F are sectional views showing a multi-domain liquid crystal display device, taken along lines II–II' of FIG. 7A.
Figure 8B:
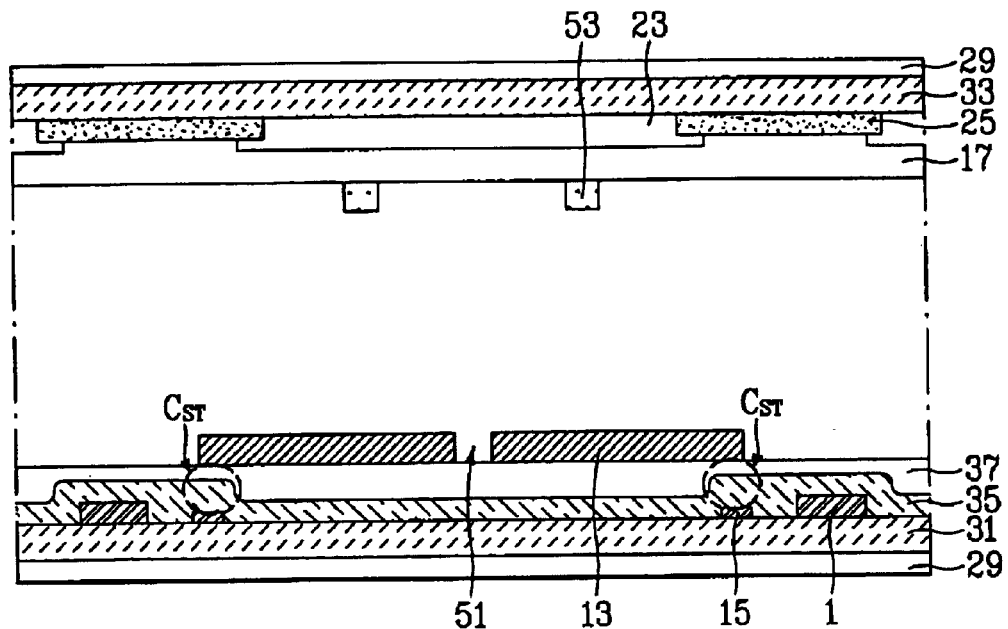
Figure 8C:
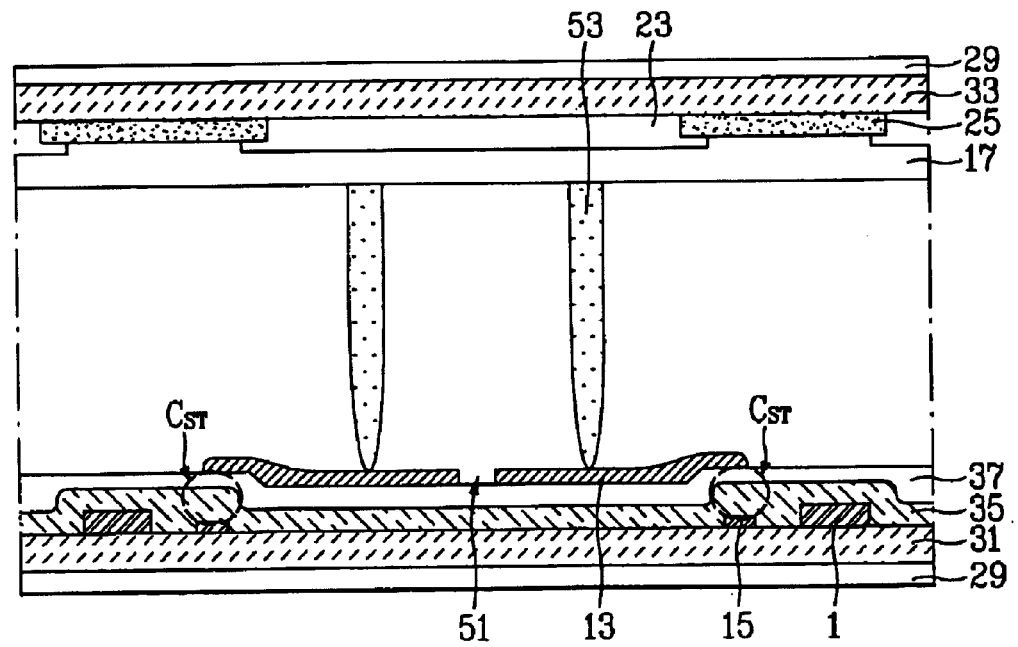
Figure 8D:
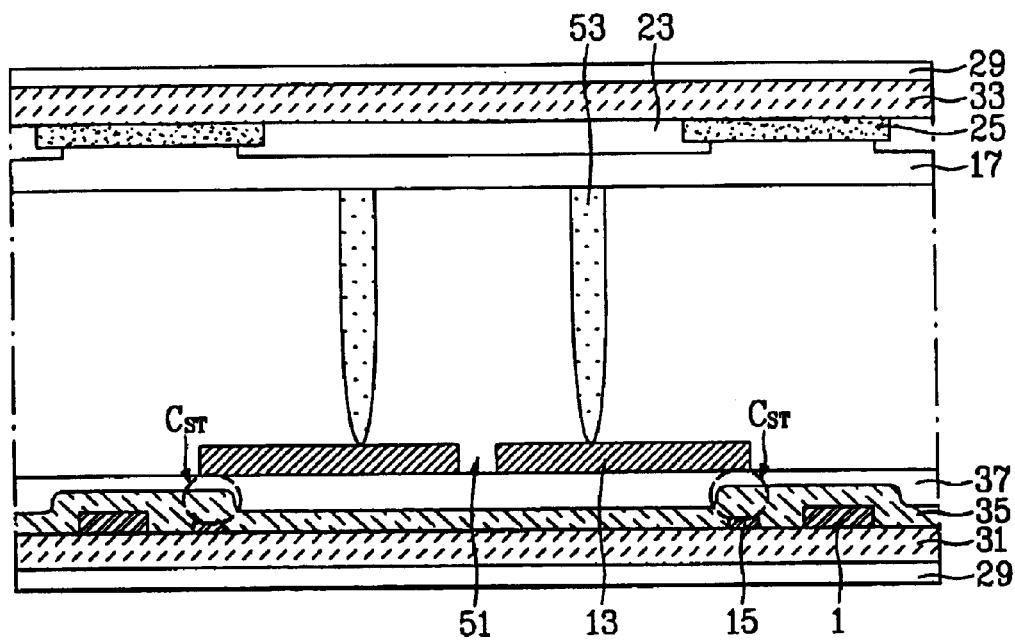
Figure 8E:
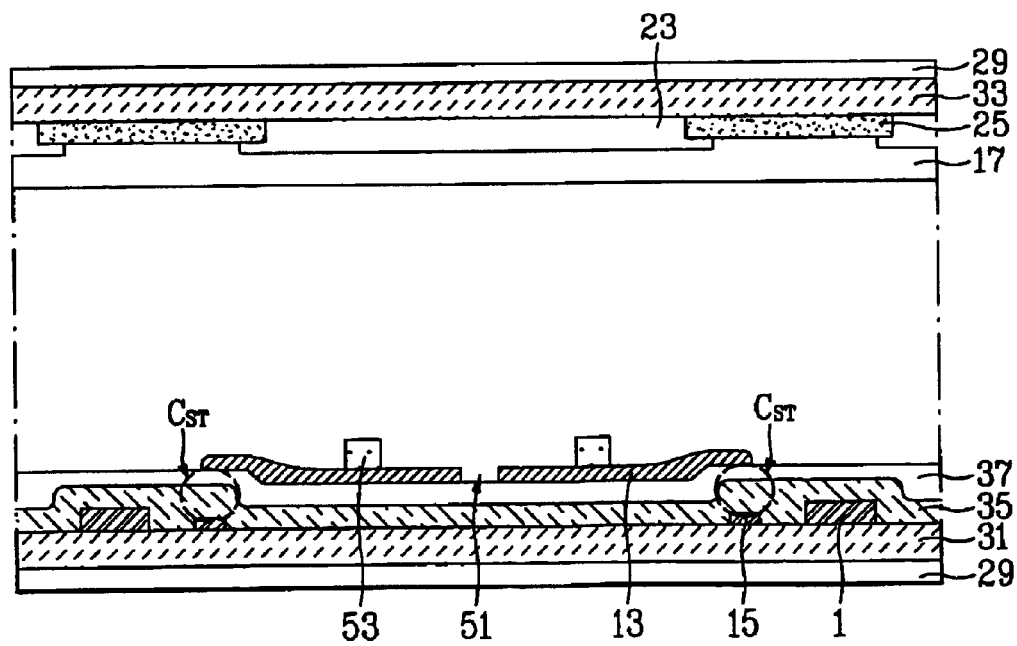
Figure 8F:
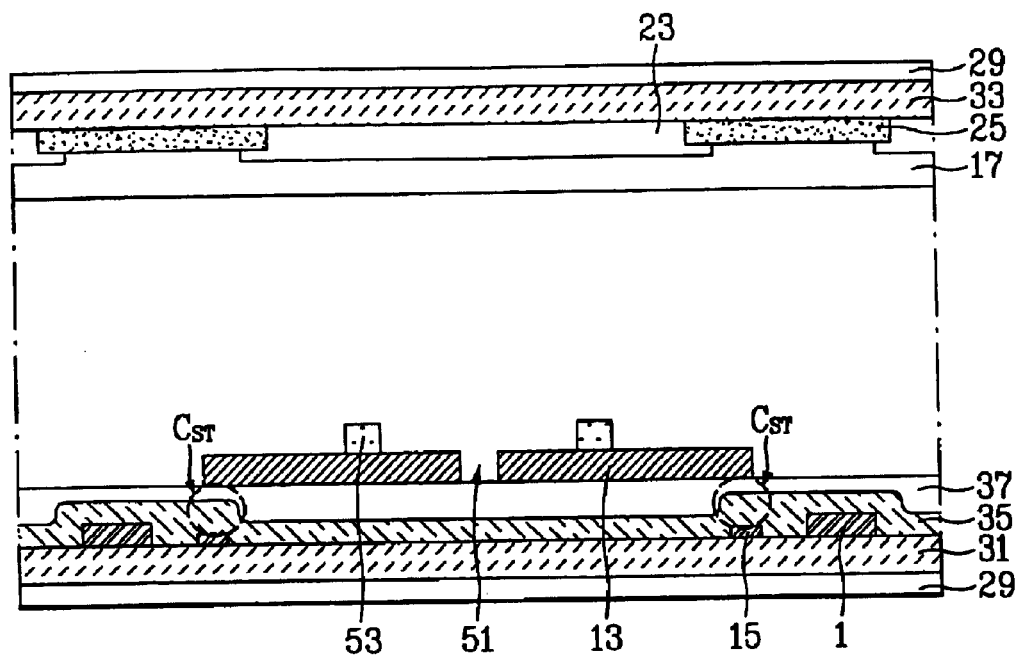

In FIGS. 8A and 8B, the dielectric structures have low projection shapes. In FIGS. 8C and 8D, the dielectric structures extend to the second substrate to maintain a cell gap of the liquid crystal display device. In FIGS. 8A and 8C, the passivation film 37 is formed of a material such as $SiN_x$ or $SiO_x$. In FIGS. 8B and 8D, the passivation film 37 is formed of BCB, acrylic resin or polyimide compound. In FIGS. 8E and 8F, the dielectric structures 53 have low projection shapes on the pixel electrode 13.

Figure 9A:
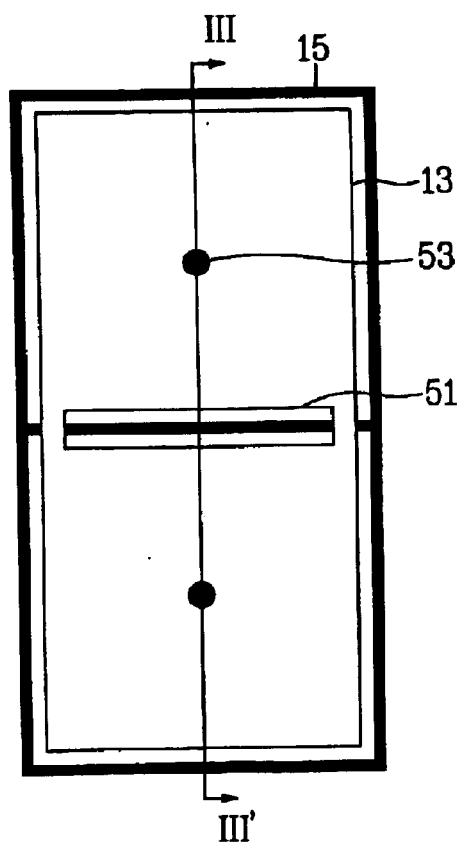
FIGS. 9A and 9B are plane views showing a multi-domain liquid crystal display device according to the third embodiment of the present invention.
Figure 9B:
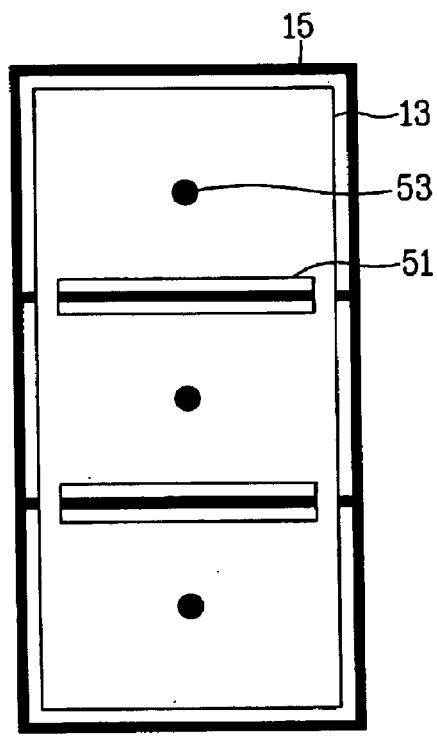

In the multi-domain liquid crystal display device shown in FIGS. 9A and 9B, at least one or more electric field induction windows 51 are formed in the pixel electrode 13. The common auxiliary electrode 15 is formed around the pixel regions and in a region where the electric field induction windows are formed, and the dielectric structures 53 are formed in the pixel regions. In this structure, the pixel electrode 13 does not overlap the common auxiliary electrode 15 while the light-shielding layer 25 overlaps the pixel electrode 13 to prevent light from being leaked out.

Figure 10A:
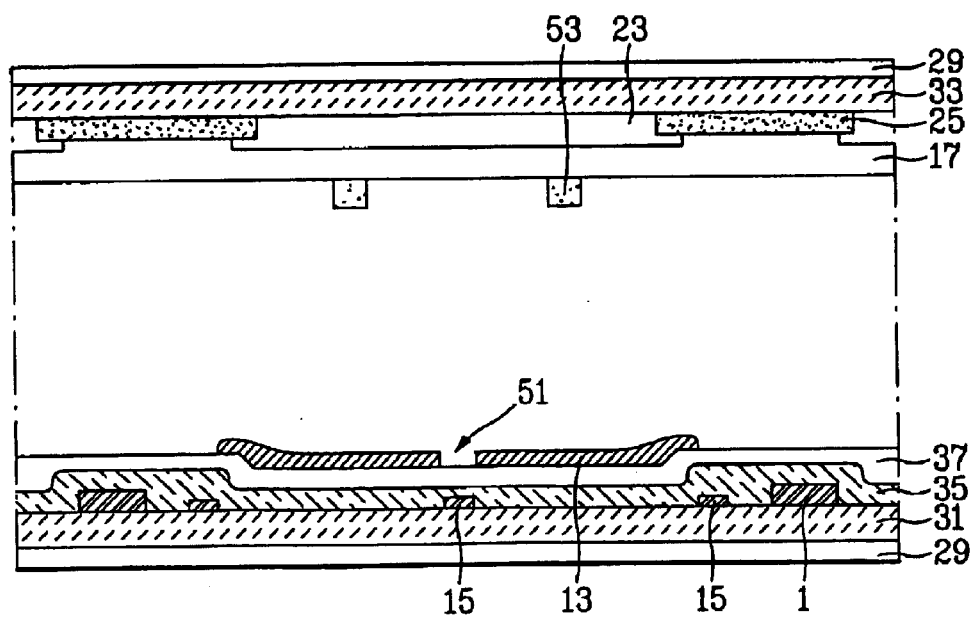
FIGS. 10A to 10F are sectional views showing a multi-domain liquid crystal display device, taken along line III–III' of FIG. 9A.
Figure 10B:
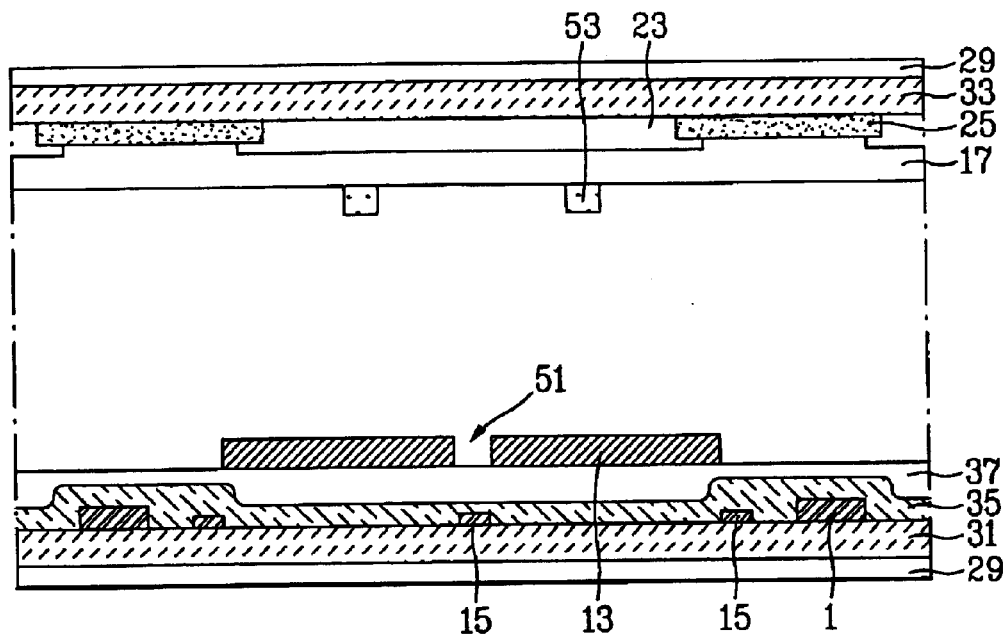
Figure 10C:
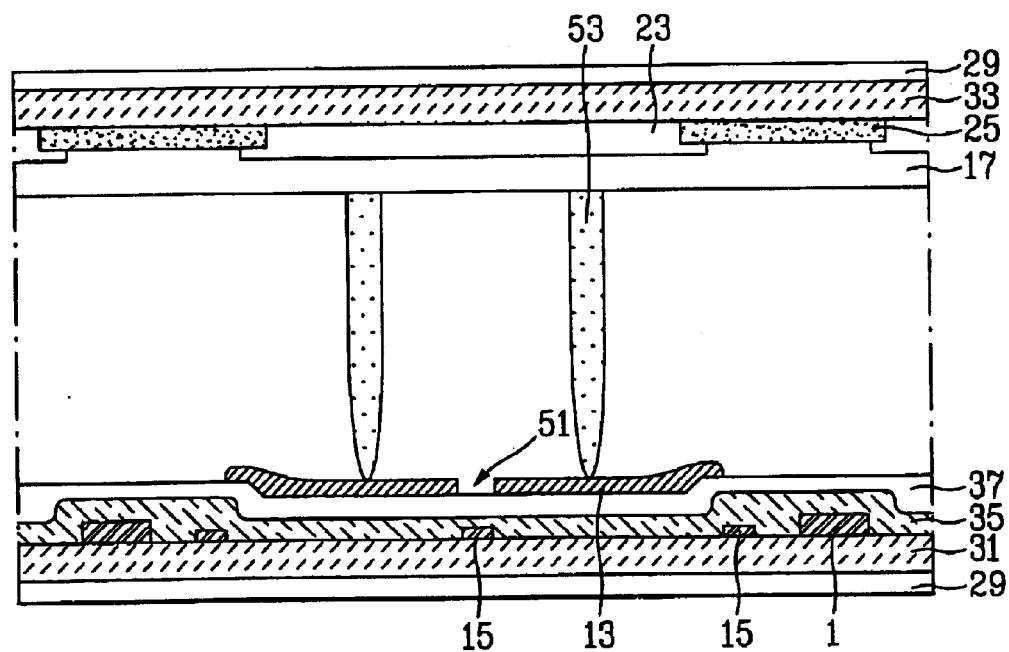
Figure 10D:
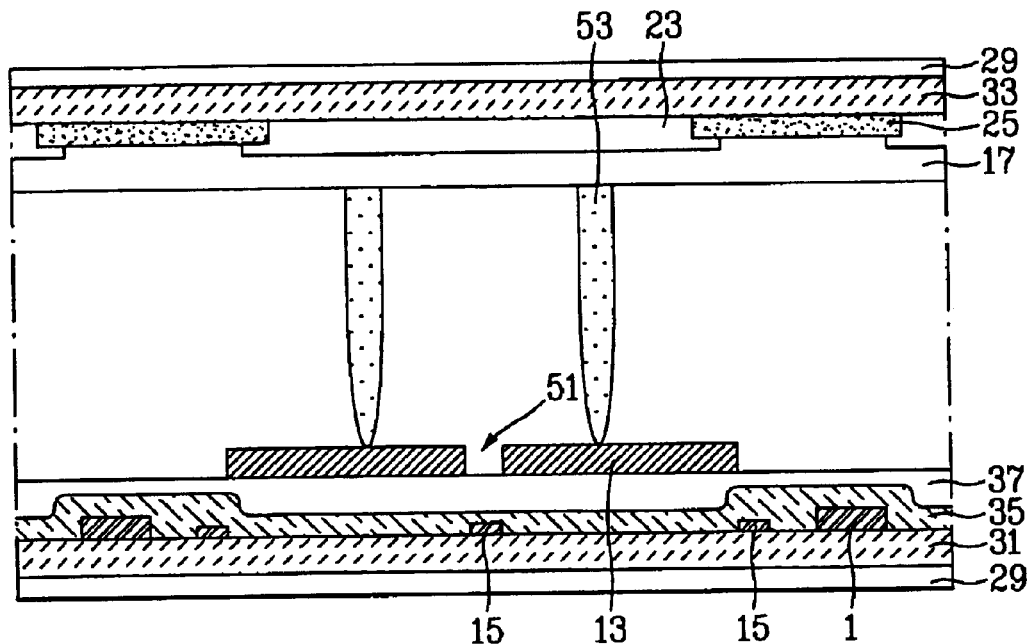
Figure 10E:
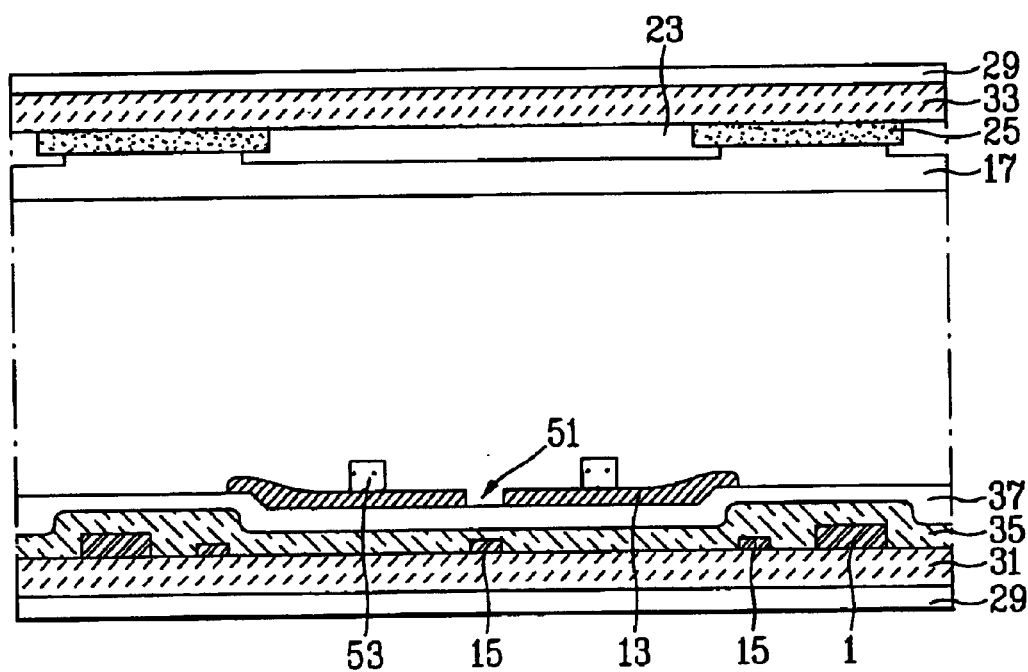
Figure 10F:
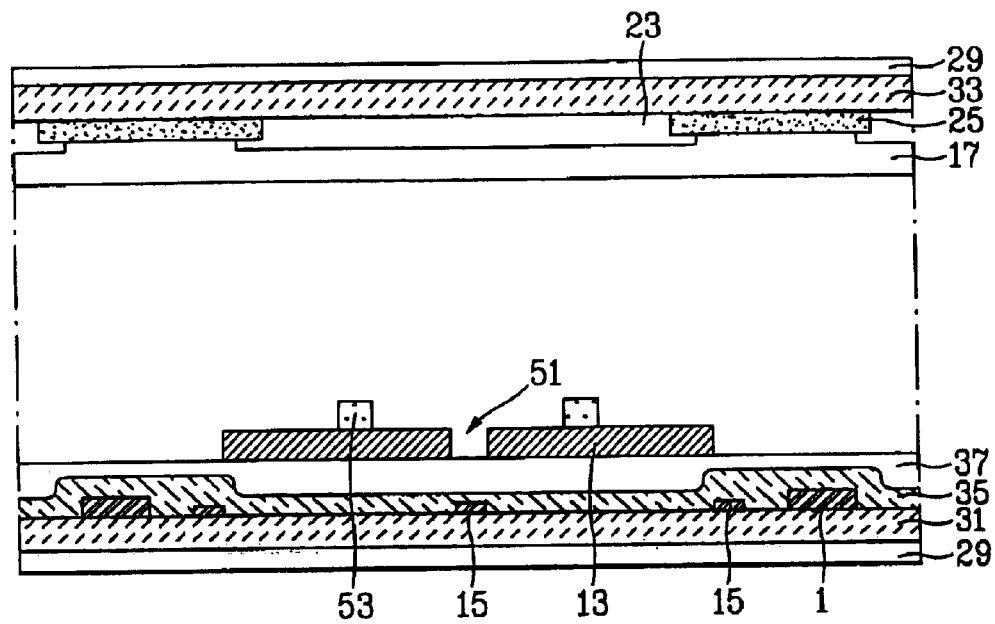

In FIGS. 10A and 10B, the dielectric structures have low projection shapes. In FIGS. 10C and 10D, the dielectric structures 53 extend to the second substrate to maintain a cell gap of the liquid crystal display device. In FIGS. 10A and 10C, the passivation film 37 is formed of a material such as $SiN_x$ or $SiO_x$. In FIGS. 10B and 10D, the passivation film 37 is formed of BCB, acrylic resin or polyimide compound. In FIGS. 10E and 10F, the dielectric structures 53 have low projection shapes on the pixel electrode 13.

Figure 11A:
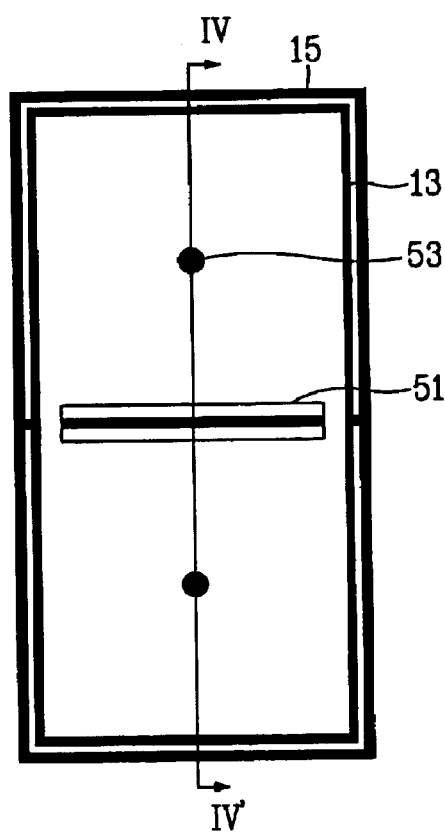
FIGS. 11A and 11B are plane views showing a multi-domain liquid crystal display device according to the fourth embodiment of the present invention.
Figure 11B:
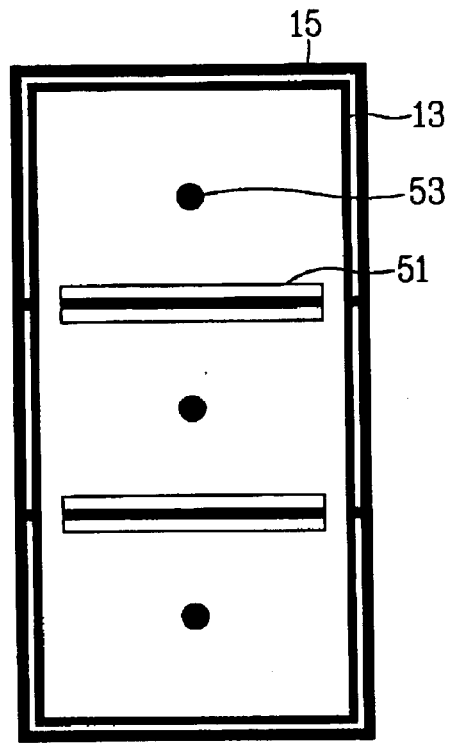

In the multi-domain liquid crystal display device shown in FIGS. 11A and 11b, at least one or more electric field induction windows 51 are formed in the pixel electrode 13, the common auxiliary electrode 15 is formed around the pixel regions and in a region where the electric field induction windows are formed, and the dielectric structures 53 are formed in the pixel regions. In this structure, the pixel electrode 13 overlaps the common auxiliary electrode 15 to form a storage capacitor. The light-shielding layer 25 also overlaps the common auxiliary electrode 15 to improve aperture ratio.

Figure 12A:
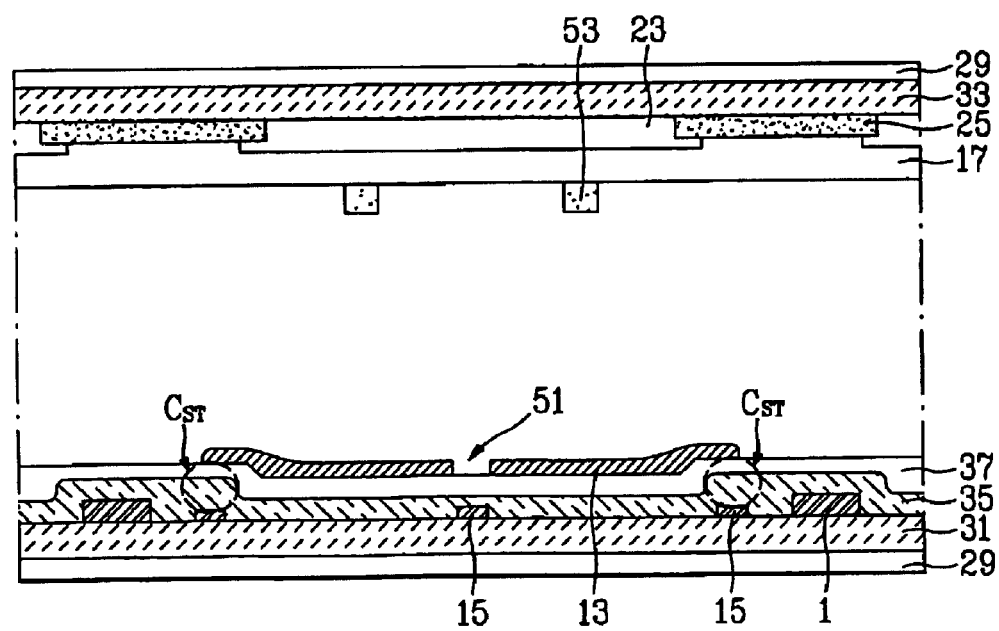
FIGS. 12A to 12F are sectional views showing a multi-domain liquid crystal display device, taken along line IV–IV' of FIG. 11A.
Figure 12B:
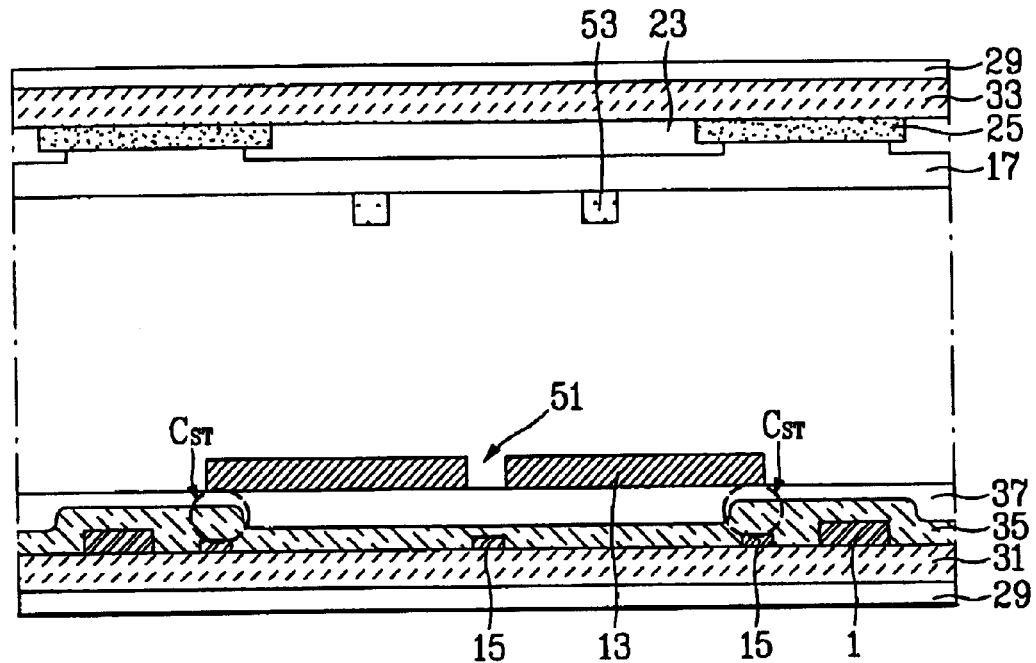
Figure 12C:
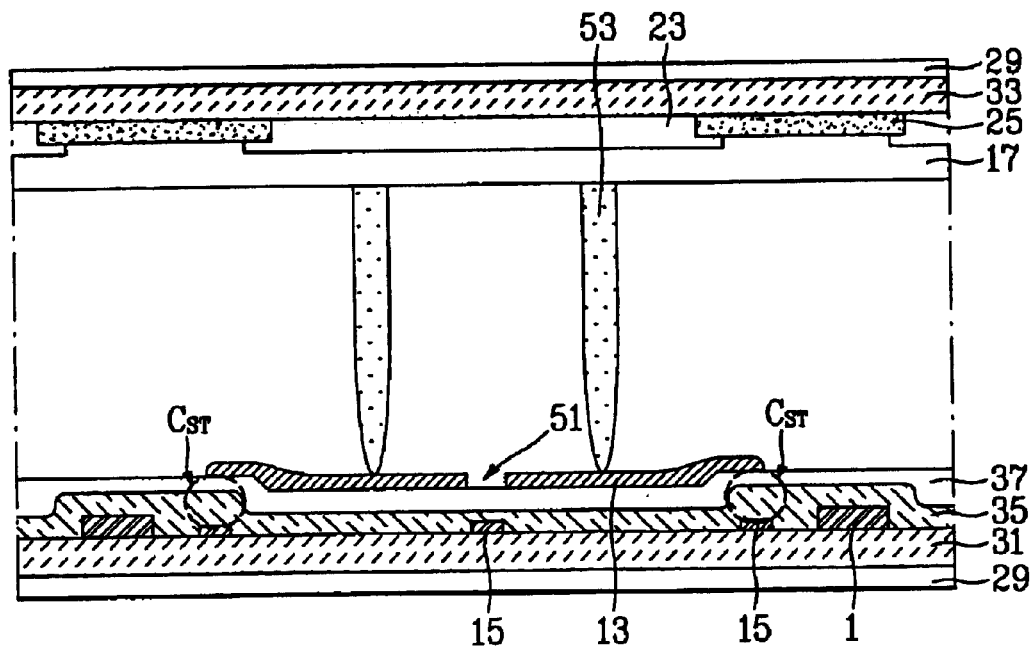
Figure 12D:
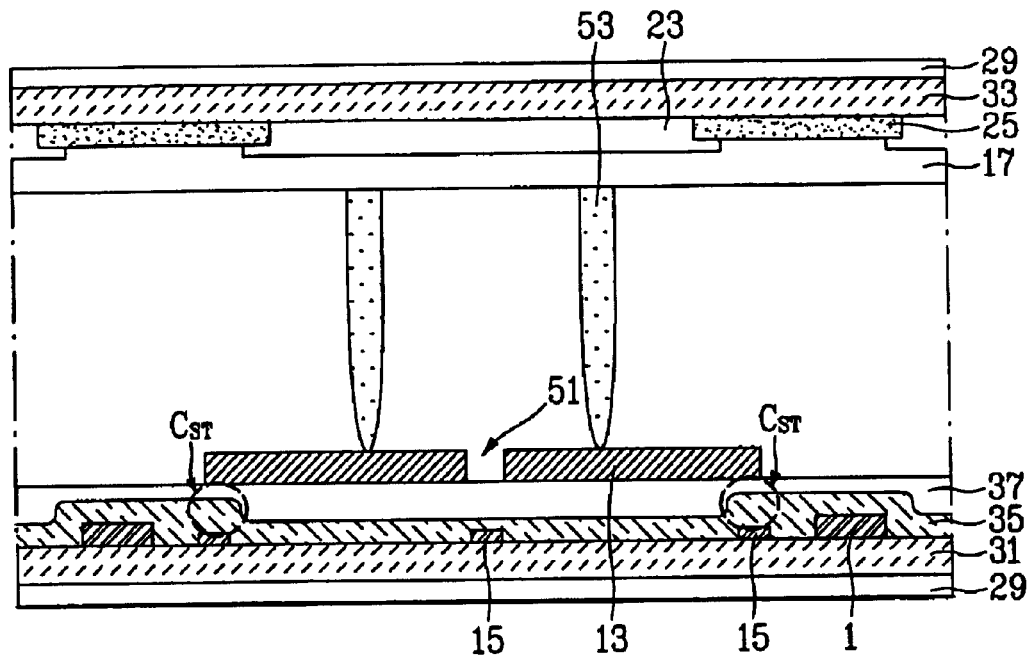
Figure 12E:
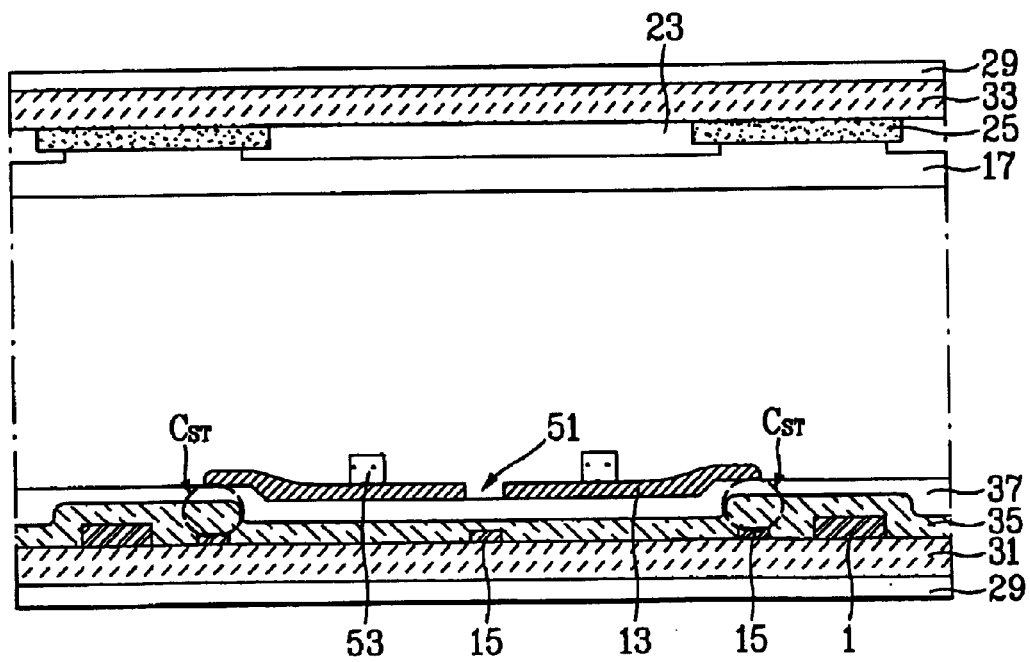
Figure 12F:
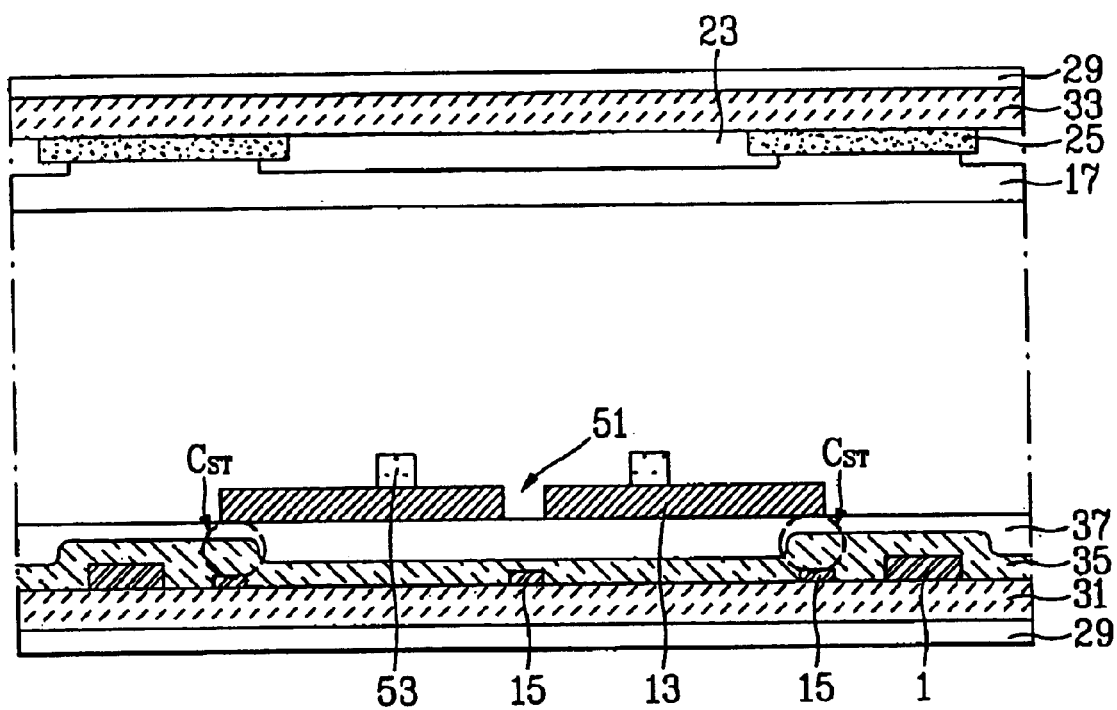

In FIGS. 12A and 12B, the dielectric structure 53s have low projection shapes. In FIGS. 12C and 12D, the dielectric structures extend to the second substrate to maintain a cell gap of the liquid crystal display device. In FIGS. 12A and 12C, the passivation film 37 is formed of a material such as $SiN_x$ or $SiO_x$. In FIGS. 12B and 12D, the passivation film 37 is formed of BCB, acrylic resin or polyimide compound. In FIGS. 12E and 12F, the dielectric structures 53 have low projection shapes on the pixel electrode 13.

Figure 13B:
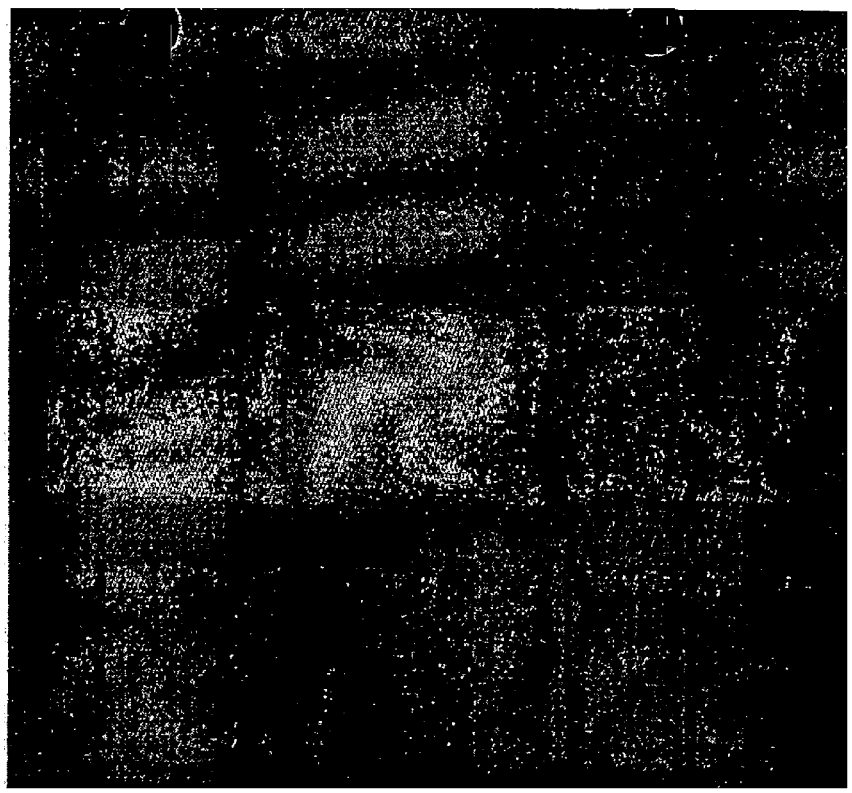
FIGS. 13A to 13B show textures when driving a related art liquid crystal display device and a multi-domain liquid crystal display device according to the present invention.
Figure 13A:
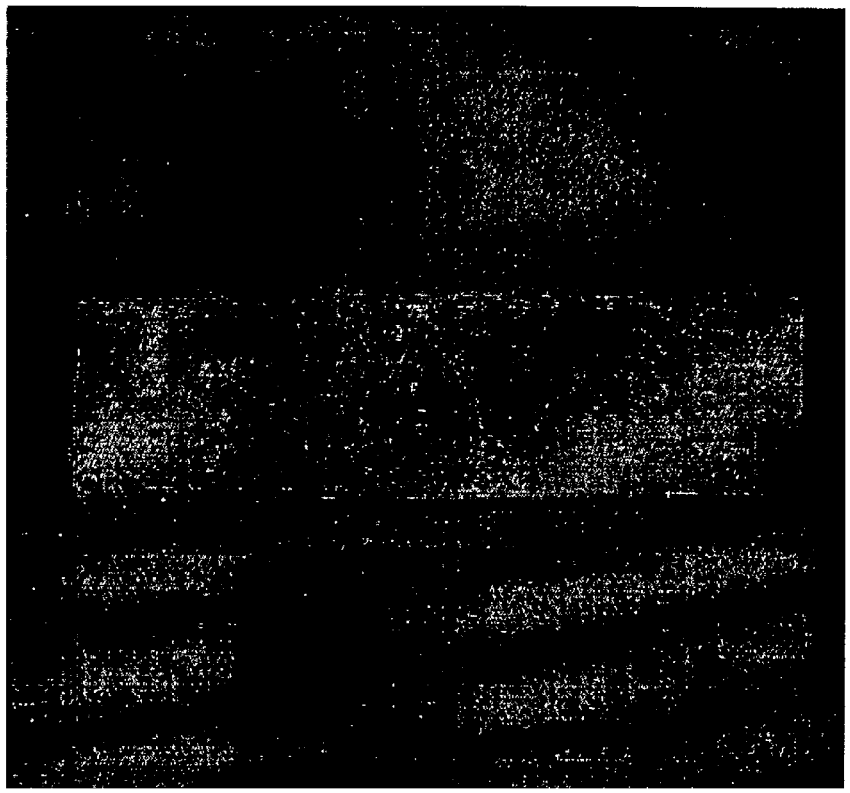

FIGS. 13A to 13B show textures when driving a multi-domain liquid crystal display device according to the present invention and a related art liquid crystal display device.

Referring to FIG. 13A, the dielectric structure in the pixel region controls the electric field. Therefore, it is noted that uniform texture is formed for each domain. However, in FIG. 13B, it is noted that uneven texture is formed for each domain, thereby causing poor picture display.

Additionally, in the multi-domain liquid crystal display device of the present invention, an alignment film (not shown) is formed on the first substrate and/or the second substrate. The alignment film is formed of a photo reactive material such as PVCN (Polyvinylcinnamate), PSCN (Polysiloxanecinnamate), or CelCN (Cellulosecinnamate). The other materials suitable for photo-alignment may be used as the alignment film.

Light is radiated to the photo-alignment film at least one time to determine a pretilt angle and alignment direction or pretilt direction of the director of the liquid crystal molecule simultaneously, thereby obtaining stable alignment of the liquid crystal. The ultraviolet light is suitable for the photo-alignment. Non-polarized light, unpolarited light linear-polarized light or partially polarized light may be used for the photo-alignment.

Photo-alignment or rubbing is applicable to one of the first substrate and the second substrate or both substrates. Different alignment methods are applicable to both substrates. Optimally, alignment process may be skipped, even after forming the alignment film.

Furthermore, the aforementioned alignment is performed to form the multi-domain liquid crystal display device divided into at least two regions. Thus, the liquid crystal molecule of the liquid crystal layer may be aligned differently on each region. In other words, each pixel is divided into four regions in + shape or X shape, or each pixel is divided in horizontal, vertical, or diagonal direction. Alignment process or alignment direction is varied depending on each region and each substrate, so that multi-domain effect can be realized. At least one region of the divided regions may be an "unaligned" region or all the divided regions may be unaligned.

As aforementioned, the multi-domain liquid crystal display device has the following advantages.

The common auxiliary electrode is formed on the same layer as the gate lines around and/or in the pixel region. The electric field induction windows and the dielectric structures, as well as the common auxiliary electrode, are formed within the pixel electrode so that the electric field distortion can be induced. Thus, alignment direction is easily controlled within the domain, and stable texture in picture display is obtained. Thus, the viewing angle and the multi-domain effect are improved. In addition, because the common auxiliary electrode is formed on the same layer as the gate lines, electrical shorting between the pixel electrode and the common auxiliary electrode is avoided and yield can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a first substrate;
   a second substrate;
   a liquid crystal layer between the first and second substrates;
   a plurality of gate lines and data lines on the first substrate to define pixel regions;
   a common auxiliary electrode on the first substrate to surround the pixel regions;
   a pixel electrode having at least one or more electric field induction windows on the first substrate;
   a common electrode on the second substrate; and
   at least one or more dielectric structures on the common electrode;
   wherein the dielectric structures extend from the second substrate to the first substrate;
   wherein the dielectric structures act as a spacer between the first and second substrates; and
   wherein the common auxiliary electrode is on a layer equal to the gate lines.

2. The device of claim 1, wherein each of the pixel regions is divided into one or more sections to form a multi-domain pixel.

3. The device of claim 2, wherein the one or more sections of the pixel regions have different driving characteristics.

4. The device of claim 1, further comprising a common auxiliary electrode formed in the electric field induction windows.

5. The device of claim 1, wherein the electric field induction windows include slits.

6. The device of claim 1, wherein the common auxiliary electrode partially overlaps the pixel electrode.

7. The device of claim 1, further comprising an alignment film on at least on of the first and second substrates.

8. The device of claim 1, further comprising a phase difference film on at least one of the first and second substrates.

9. A liquid crystal display device comprising:
   a first substrate;
   a second substrate;
   a liquid crystal layer between the first and second substrates;
   a plurality of gate lines and data lines on the first substrate to define pixel regions;
   a common auxiliary electrode on the first substrate to surround the pixel regions;
   a pixel electrode having at least one or more electric field induction windows on the first substrate; and
   at least one or more dielectric structures on the pixel electrode;
   wherein the dielectric structures extend from the first substrate to the second substrate;
   wherein the dielectric structures act as a spacer between the first and second substrates; and
   wherein the common auxiliary electrode is on a layer equal to the gate lines.

10. The device of claim 9, wherein each of the pixels is divided into one or more sections to form a multi-domain pixel.

11. The device of claim 10, wherein the one or more sections of the pixel regions have different driving characteristics.

12. The device of claim 9, further comprising a common auxiliary electrode formed in the electric field induction windows.

13. The device of claim 9, wherein the electric field induction windows include slits.

14. The device of claim 9, wherein the common auxiliary electrode partially overlaps the pixel electrode.

15. The device of claim 9, further comprising an alignment film on at least one of the first and second substrates.

16. The device of claim 9, further comprising a phase difference film on at least one of the first and second substrates.

* * * * *